US012729262B2

(12) United States Patent
Wang et al.

(10) Patent No.: US 12,729,262 B2
(45) Date of Patent: Sep. 8, 2026

(54) PREPARATION OF POLYOLEFIN-POLYACRYLATE BLOCK COPOLYMERS ADDITIVES FOR INCREASING SURFACE ENERGY OF POLYETHYLENE

(71) Applicant: Dow Global Technologies LLC, Midland, MI (US)

(72) Inventors: Tao Wang, Shanghai (CN); Hongyu Chen, Shanghai (CN); Zachary Kean, Midland, MI (US); Todd Senecal, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 694 days.

(21) Appl. No.: 18/036,118

(22) PCT Filed: Nov. 10, 2021

(86) PCT No.: PCT/US2021/058729
§ 371 (c)(1),
(2) Date: May 9, 2023

(87) PCT Pub. No.: WO2022/103800
PCT Pub. Date: May 19, 2022

(65) Prior Publication Data

US 2023/0406985 A1 Dec. 21, 2023

Related U.S. Application Data

(60) Provisional application No. 63/111,985, filed on Nov. 10, 2020.

(51) Int. Cl.

| | |
|---|---|
| ***C08F 297/02*** | (2006.01) |
| ***C08J 5/18*** | (2006.01) |
| ***C08L 53/00*** | (2006.01) |

(52) U.S. Cl.
CPC ............ *C08F 297/026* (2013.01); *C08J 5/18* (2013.01); *C08L 53/00* (2013.01); *C08J 2353/00* (2013.01)

(58) Field of Classification Search
CPC ...... C08F 210/14; C08F 10/02; C08F 110/02; C08F 297/026; C08F 2/38; C08F 10/00;
(Continued)

(56) References Cited

U.S. PATENT DOCUMENTS 6,537,660 B2 3/2003 Katayama et al.
6,777,509 B2 8/2004 Brown et al.
(Continued)

FOREIGN PATENT DOCUMENTS

EP 1384729 A1 1/2004
JP H07330966 A 12/1995
(Continued)

OTHER PUBLICATIONS

Communication Pursuant to Article 94(3) EPC dated Feb. 21, 2024, pertaining to EP Patent Application No. 21 830 824.5, 3 pgs.
(Continued)

*Primary Examiner* — Mark S Kaucher
(74) *Attorney, Agent, or Firm* — Dinsmore & Shohl LLP

(57) ABSTRACT

This disclosure includes a polymer blend comprising. The polymer blend includes at least 60% by weight olefin-based polymer, and a diblock copolymer comprising an non-polar block and a polar block, wherein the diblock copolymer has a number average molecular weight number ($M_n$) less than 5000 g/mol as determined by proton nuclear magnetic resonance ($^1$H NMR); and wherein the non-polar block and the polar block are connected by a thiol linkage.

18 Claims, 3 Drawing Sheets

(58) Field of Classification Search
CPC ...... C08F 2500/29; C08F 8/12; C08F 210/16; C08F 2500/03
See application file for complete search history.

(56) References Cited

U.S. PATENT DOCUMENTS

| | | | |
|---|---|---|---|
| 6,869,904 B2 | 3/2005 | Boussie et al. | |
| 6,900,321 B2 | 5/2005 | Boussie et al. | |
| 6,953,764 B2 | 10/2005 | Frazier et al. | |
| 7,355,089 B2 | 4/2008 | Chang et al. | |
| 7,601,778 B2 | 10/2009 | Matsunaga et al. | |
| 7,650,930 B2 | 1/2010 | Cheluget et al. | |
| 7,858,706 B2 | 12/2010 | Arriola et al. | |
| 8,058,373 B2 | 11/2011 | Stevens et al. | |
| 8,372,927 B2 | 2/2013 | Figueroa et al. | |
| 8,785,554 B2 | 7/2014 | Li Pi Shan et al. | |
| 10,100,140 B2 * | 10/2018 | Scott | C08F 297/048 |
| 10,370,521 B2 * | 8/2019 | Guironnet | C08K 5/541 |
| 2003/0055179 A1 | 3/2003 | Ota et al. | |
| 2006/0178486 A1 | 8/2006 | Suzuki et al. | |
| 2006/0199930 A1 | 9/2006 | Li Pi Shan et al. | |
| 2007/0167578 A1 | 7/2007 | Arriola et al. | |
| 2008/0311812 A1 | 12/2008 | Arriola et al. | |
| 2009/0136774 A1 | 5/2009 | Onogi et al. | |
| 2009/0306318 A1 | 12/2009 | Boone et al. | |
| 2011/0294933 A1 | 12/2011 | Jaunky et al. | |
| 2015/0011447 A1 | 1/2015 | Waterson et al. | |
| 2019/0300811 A1 * | 10/2019 | Tsou | C10M 145/00 |
| 2023/0399450 A1 * | 12/2023 | Kean | C08F 2/38 |

FOREIGN PATENT DOCUMENTS

| | | |
|---|---|---|
| JP | H09031145 A | 2/1997 |
| JP | 3481733 B2 * | 12/2003 |
| JP | 2013072048 A * | 4/2013 |
| JP | 2020164783 A * | 10/2020 |
| WO | 99/41294 A1 | 8/1999 |
| WO | 2005/090426 A1 | 9/2005 |
| WO | 2005/090427 A2 | 9/2005 |
| WO | 2007/035485 A1 | 3/2007 |
| WO | 2007/130306 A2 | 11/2007 |
| WO | 2007/130307 A2 | 11/2007 |
| WO | 2007/136496 A2 | 11/2007 |
| WO | 2009/012215 A1 | 1/2009 |
| WO | 2010/022228 A2 | 2/2010 |
| WO | 2011/102989 A1 | 8/2011 |
| WO | 2014/105411 A1 | 7/2014 |
| WO | 2017/044547 A1 | 3/2017 |
| WO | 2017/173080 A1 | 10/2017 |
| WO | 2019/173993 A1 | 9/2019 |

OTHER PUBLICATIONS

Chinese Office Action dated Mar. 19, 2026, pertaining to CN Patent Application No. 202180072777.7, 10 pgs.

International Search Report and Written Opinion dated Feb. 23, 2022, pertaining to International Patent Application No. PCT/US2021/058729, 12 pgs.

International Search Report and Written Opinion dated Mar. 3, 2022, pertaining to International Patent Application No. PCT/US2021/058732, 15 pgs.

Nagata, K., et al., "Influence of addition of polyethylene-block-polyacrylate copolymer on the impact strength of PP/EPDM/talc composites," Nippon Gomu Kyokaishi (Journal of the Society of Rubber Industry, Japan), vol. 79, No. 5, pp. 267-270 (2006).

Snijder, Auke et al., "End-Group Modification of Poly(butyl acrylate) Prepared by Atom Transfer Radical Polymerization: Mechanistic Study Using Gradient Polymer Elution Chromatography," Journal of Polymer Science Part A: Polymer Chemistry, vol. 40, pp. 2350-2359 (2002).

Tasdelen, Mehmet Atilla, et al., "Telechelic polymers by living and controlled/living polymerization methods," Progress in Polymer Science, vol. 35, pp. 455-567 (2011).

Indonesian Examination Report dated Oct. 22, 2025, pertaining to ID Patent Application No. P00202304928, 5 pgs.

Japanese Notice of Reasons for Refusal dated Sep. 1, 2025, pertaining to JP Patent Application No. 2023-527067, 16 pgs.

Brazilian Technical Report dated Sep. 4, 2025, pertaining to BR Patent Application No. 112023008103.3, 8 pgs.

Japanese Notice of Reasons for Refusal dated Sep. 11, 2025, pertaining to JP Patent Application No. 2023-525504, 6 pgs.

Brazilian Technical Report dated Sep. 11, 2025, pertaining to BR Patent Application No. BR112023007877.6, 8 pgs.

Chinese Office Action dated Jun. 11, 2026, pertaining to CN Patent Application No. 202180074705.6, 8 pgs.

* cited by examiner

PREPARATION OF POLYOLEFIN-POLYACRYLATE BLOCK COPOLYMERS ADDITIVES FOR INCREASING SURFACE ENERGY OF POLYETHYLENE

CROSS REFERENCE TO RELATED APPLICATIONS

This application claims priority to U.S. Provisional Patent Application No. 63/111,985, filed on Nov. 10, 2020, and International Patent Application No. PCT/US2021/058729, filed on Nov. 10, 2021, the entireties of both which are hereby incorporated by reference.

TECHNICAL FIELD

Embodiments of the present disclosure generally relate to processes to produce polyolefin-polylacrylate diblock copolymers additives to increase the surface energy of polyethylene.

BACKGROUND

Polyethylene (PE) is an important polymer material. However, adhesion of polyethylene to other materials, especially polar materials like polyester, polyurethane, polyamide, acrylic copolymer, etc, is very poor because of its low polarity and low surface energy. This is a drawback in applications such as lamination, painting, and printing (typically surface energy above 38 dyne/cm is desired for those processes).

To improve the hydrophilicity and the adhesive properties of PE film, various techniques have been applied to modify the film surface, such as flame treatment, plasma treatment, physical or chemical treatment, grafting, a primer, corona treatment, and additive blending.

Corona or plasma treatment is widely used in polyethylene film industry. By treating a film twice with the plasma treatment, one can adjust the surface of the polyethylene film during processing. However, the modification of the PE surface by corona or plasma treatment may be temporary as a result of thermodynamic forces over time. While the plasma or corona treatment may be temporary, nevertheless there is an increase in surface energy upon treatment.

The processing additives (such as slipping agents and anti-blocking agents) tend to migrate to the surface of polyethylene films in the course of hydrophobic recovery because of the incompatibility with polyethylene, thereby decreasing the surface energy of the PE film. However, low molecular weight small molecule additives remain problematic as they are prone be removed from the surface. A diblock copolymer containing a non-polar and polar block is more likely to have the non-polar block entangled with the PE film and thus be less likely to be removed from washing or abrasion.

SUMMARY

Ongoing needs exist to develop methods of producing high purity polyolefin block copolymers including polar monomers such as, for example, polyolefin-polyacrylate block copolymers.

Embodiments of the presence disclosure includes polymer blends. The polymer blends comprises at least 60% by weight olefin-based polymer and a diblock copolymer. The diblock copolymer includes a non-polar block and a polar block. The diblock copolymer has a number average molecular weight number (M e) from 500 g/mol to 5000 g/mol as determined by $^1$H NMR; and wherein the non-polar block and the polar block are connected by a thiol linkage.

DETAILED DESCRIPTION

Figure 1:
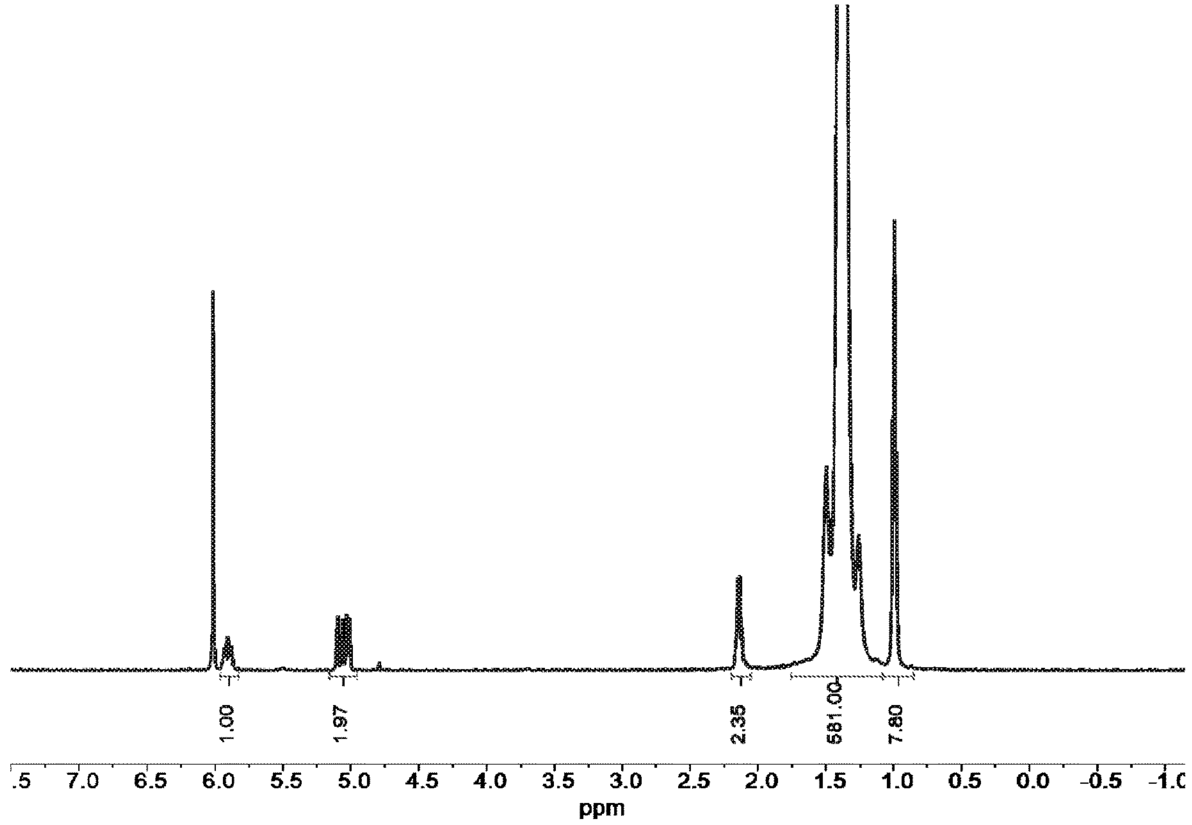
FIG. 1 is a spectrum of the proton NMR ($^1$H NMR) of a vinyl-terminated polyolefin.

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an open-ended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

The term "polymer" refers to a compound prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers, and for the purpose of this disclosure may include "terpolymers" and "interpolymer."

The term "block copolymer" refers to a multi-block interpolymer and includes one or more monomers polymerized form, characterized by multiple blocks or segments of two or more polymerized monomer units, the blocks or segments differing in chemical or physical properties. Specifically, the term "block copolymer" refers to a polymer comprising two or more chemically distinct regions or segments (referred to as "blocks") joined in a linear manner. A "diblock copolymer" includes only two blocks or segments. For example a diblock copolymer may include a polyethylene segment and a polyacrylamide segment. Block copolymers may be characterized by unique distributions of both polymer dispersity (Đ or Mw/Mn). The term "diblock copolymer" refers to a copolymer having two chemically distinct regions or segments joined in a linear manner.

The term "chain transfer agent" refers to a compound or mixture of compounds that is capable of causing reversible or irreversible polymeryl exchange with active catalyst sites. Irreversible chain transfer refers to a transfer of a growing polymer chain from the active catalyst to the chain transfer agent that results in termination of polymer chain growth. Reversible chain transfer refers to transfers of growing polymer chain back and forth between the active catalyst and the chain transfer agent. The term "polymeryl" refers to a polymer missing one hydrogen atoms on the carbon at the point of attachment, for example to the aluminum from the chain transfer agent.

Embodiments of the presence disclosure includes polymer blends. The polymer blends comprises at least 60% by weight olefin-based polymer and a diblock copolymer. The diblock copolymer includes a non-polar block and a polar block. The diblock copolymer has a number average molecular weight number ($M_n$) from less than or equal to 5000 g/mol as determined by $^1$H NMR; and wherein the non-polar block and the polar block are connected by a thiol linkage.

In or more embodiments, the polymer of this disclosure is an olefin-based copolymer is an ethylene-based copolymer. The ethylene-based copolymer comprises at least 50 mol % ethylene. In this disclosure, "ethylene-based polymer" refer to homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene-based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In one or more embodiments, the polymer blend includes from 0.5% by weight to 20% by weight diblock copolymer, based on the total weight of the polymer blend. In some embodiments, the polymer blend includes from 1% by weight to 18% by weight, or from 2% by weight to 18% by weight, or from 3% by weight to 16% by weight, or from 3% by weight to 15% by weight, or from 5% by weight to 15% by weight, or from 2% to 10% by weight diblock copolymer, based on the total weight of the polymer blend. In various embodiments, the polymer blend comprises from 5% by weight to 10% by weight diblock copolymer, based on the total weight of the polymer blend.

In some embodiments, the non-polar block is a polyethylene polymer. In one or more embodiments, the non-polar block includes 100% ethylene-monomer units, i.e., a homopolymer. In various embodiments, the non-polar block comprises units derived from ethylene and optionally comprises units derived from one or more ($C_3$-$C_{12}$)α-olefin, i.e. copolymers. The ($C_3$-$C_{12}$)α-olefin may include propylene, 1-butene, 1-pentene, 1-hexene or 1-octene. The non-polar block may include a high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), and ultra low density polyethylene (ULDPE), or mixtures thereof.

In one or more embodiments, the non-polar block comprises units derived from ethylene and propene, 1-butene, 1-hexene, or 1-octene. In embodiments, the polar block comprises units derived from one or more acrylate monomers. In some embodiments, the polar block comprises monomers selected from n-butyl acrylate, tert-butyl acrylate, acrylic acid, and combinations of n-butyl acrylate, tert-butyl acrylate and acrylic acid.

In one or more embodiments, the $M_n$ ratio of the non-polar block to polar block is from 0.1:10 to 10:0.1. In some embodiments, the $M_n$ ratio of the non-polar block to polar block is from 1:10 to 10:1, 0.5:9 to 9:0.5, 2:8 to 8:2, or 4:8 to 8:4.

In one or more embodiments, the non-polar block of the diblock copolymer is polyolefin. In some embodiments, the non-polar block is polyethylene copolymer. In various embodiments, the diblock copolymer includes at least 40% by weight (or weight percent) of the non-polar block. In some embodiments, the diblock copolymer includes at least 50% by weight of the non-polar block.

In one or more embodiments, the non-polar block of the non-polar—polar diblock copolymer has a number average molecular weight number ($M_n$) from 1.0 to 3,500 kg/mol. In some embodiments, the non-polar block of the non-polar—polar diblock copolymer has a $M_n$ of 1.0 to 30 kg/mol. In various embodiments, the non-polar block of the non-polar—polar diblock copolymer has a $M_n$ of 1.5 to 20 kg/mol.

In one or more embodiments, the polar block of the non-polar—polar diblock copolymer is polyacrylate. In various embodiments, the non-polar—polar diblock copolymer includes from 10% to 60% by weight (or weight percent) of the polar block.

In one or more embodiments, the diblock copolymer has a number average molecular weight number ($M_n$) less than 5,000 g/mol. In some embodiments, the diblock copolymer has a $M_n$ from 100 to 5,000 g/mol, 500 to 5,000 g/mol, from 1,000 to 5,000 g/mol, or from 1,000 to 4,500 g/mol.

In various embodiments, the diblock copolymer is a polyolefin-polyacrylate diblock copolymer.

Embodiments of this disclosure include a film having the polymer blend according this disclosure. As described in more detail in the example section of this disclosure, the film has a surface energy of greater than 30 dyne/cm.

Embodiments of this disclosure further provide a method of treating a film having the polymer blends as previously described. The method includes subjecting the film according having the polymer blend of this disclosure to a plasma treatment. As described in more detail in the example section, the film treated with plasma has a surface energy of greater than 35 dyne/cm. Additionally, the film treated with a plasma maintains a surface energy of greater than 35 dyne/cm at least three weeks after the plasma treatment.

In some embodiments, the diblock copolymer is a polyolefin-polyacrylate diblock copolymer. The methods for making the polyolefin-polyacrylate diblock copolymer include polymerizing one or more olefin monomers in the presence of an alkyl aluminum chain transfer agent to produce a polymeryl aluminum species, which is then heated to produce a vinyl-terminated polyolefin. A thiol compound is reacted with the vinyl-terminated polyolefin to form a sulfide-containing polyolefin intermediate. A macroinitiator is produced by reacting the sulfide-containing polyolefin intermediate with a linker. The macroinitiator, a radical reagent, and $CH_2$=CH—(X) monomers are reacted via controlled radical polymerization reaction to produce the polyolefin-polyacrylate diblock copolymer.

In one or more embodiments, olefin monomers polymerized in the presence of an alkyl aluminum chain transfer agent include $(C_2\text{-}C_{12})\alpha$-olefin monomers. In some embodiments, the olefin monomers include ethylene, propylene, 1-butene, 1-pentene, 1-hexene, 1-heptene, 1-octene, 1-nonene, 1-decene, 1-undecene, 1-decadene. In various embodiments, the olefin monomers are ethylene and 1-octene; ethylene and 1-hexene; ethylene and 1-butene; or ethylene and propylene.

In various embodiments, olefin monomers polymerized in the presence of an alkyl aluminum chain transfer agent, in which the alkyl aluminum chain transfer agent is $AlR_3$, where each R is independently $(C_1\text{-}C_{12})$alkyl. In some embodiments, R is methyl, ethyl, n-propyl, 2-propyl, n-butyl, tert-butyl, iso-butyl, pentyl, hexyl, heptyl, n-octyl, tert-octyl, nonyl, decyl, undecyl, or dodecyl. Non-limiting examples of the alkyl aluminum chain transfer agent include triethyl aluminum, tri(i-propyl) aluminum, tri(i-butyl) aluminum, tri(n-hexyl) aluminum, and tri(n-octyl) aluminum.

The methods of this disclosure include polymerizing one or more olefin monomers in the presence of an alkyl aluminum chain transfer agent to produce a polymeryl aluminum species. The alkyl aluminum functions as a chain-transfer agent, which results in the formation of polymeryl aluminum species. Upon heating the polymeryl aluminum species, the vinyl-terminated polyolefin is produced. The vinyl-terminated polyolefin may be formed via a beta-elimination reaction.

The process for preparing a polyolefin component that includes vinyl-terminated polyolefin according to formula $A^1L^1$. The process includes combining ethylene and optionally one or more $(C_3\text{-}C_{12})\alpha$-olefin monomer, the alkyl aluminum chain transfer agent, and a catalyst component comprising a procatalyst to form a solution and polymerizing from greater than 10 mol % to less than or equal to 99 mol % of the ethylene and α-olefin monomers in the solution. The solution is heated to a temperature of at least 160° C. and holding the solution at the temperature of at least 160° C. for a time of at least 30 seconds; and a product is recovered. The product includes the polyolefin component comprising the unsaturated polyolefin of the formula $A^1L^1$.

In the formula $A^1L^1$, $L^1$ is a polyolefin; and $A^1$ is selected from the group consisting of a vinyl group, a vinylidene group of the formula $CH_2$=C($Y^1$)—, a vinylene group of the formula $Y^1$CH=CH—, a mixture of a vinyl group and a vinylene group of the formula $Y^1$CH=CH—, a mixture of a vinyl group and a vinylidene group of the formula $CH_2$=C($Y^1$)—, a mixture of a vinylidene group of the formula $CH_2$=C($Y^1$)— and a vinylene group of the formula $Y^1$CH=CH—, and a mixture of a vinyl group, a vinylidene group of the formula $CH_2$=C($Y^1$)—, and a vinylene group of the formula $Y^1$CH=CH—. Each $Y^1$ is a $(C_1\text{-}C_{30})$hydrocarbyl; and the unsaturated polyolefin of the formula $A^1L^1$ comprises a weight average molecular weight from 1,000 to 10,000,000 g/mol.

Without being bound by any particular theory, the alkyl aluminum chain transfer agent contributes to the formation of the unsaturated polyolefin of the formula $A^1L^1$.

The molecular weight of the diblock copolymer is varied by the amount of chain transfer agent added to the polyolefin polymerization reaction. For example, if the amount of chain transfer agent is increased, the molecular weight will decrease when compared to a polymer composition that was polymerized in the presence of a lesser amount of chain transfer agent.

Scheme 1 illustrates a synthetic procedure according to embodiments of this disclosure. In Scheme 1, Compound 1 is a vinyl-terminated polyolefin produced by the method previously described. Compound 1 is mixed with a thiol compound to form Compound 2, a sulfide-containing polyolefin intermediate. Compound 2 reacts with a linker to form a macroinitiator, Compound 3. Compound 3, a radical reagent, and $CH_2$=CH—(X) monomers (i.e. t-butyl acrylate and n-butyl acrylate) are reacted via a reversible-deactivation radical polymerization to produce Compound 4, the non-polar—polar diblock copolymer. In an optional reaction, the tert-butyl group of the units derived from tert-butyl acrylate are removed via the addition of acid to the reaction or via a thermal reaction to produce an acid non-polar—polar diblock copolymer.

The thiol compound becomes a thiol linkage of the non-polar—polar diblock copolymer upon the reaction of the thiol compound with the vinyl-terminated polyolefin and the linker. The thiol linkage is present in compounds 3, 4 and 5 in Scheme 1. The thiol linkage is illustrated by the compound A-L-B, where A is the non-polar block, L is the thiol linkage, and B is the polar block of the non-polar—polar diblock copolymer.

In one or more embodiments, the thiol linkage links the non-polar block of the non-polar—polar diblock copolymer to the polar block of the non-polar—polar diblock copolymer. The thiol linkage includes $(C_2\text{-}C_{12})$heterohydrocarbylene, in which the heterohydrocarbylene has two heteroatoms: (1) one sulfur atom and (2) one nitrogen or one oxygen atom. The $(C_2\text{-}C_{12})$heterohydrocarbylene of the thiol linkage has two radicals, one radical on the sulfur atom and one on the oxygen atom or on the nitrogen atom.

In some embodiments, the thiol linkage has a structure according to —S—$(CH_2)_x$—Y—, wherein x is 2 to 12; and Y is oxygen (—O—) or —N(H)—In various embodiments, the thiol linkage results from the reaction of the thiol compound of formula (I) with the functional groups on both the polymer block and the non-polar block.

Scheme 1 Polymerization procedure for the synthesis of the Non-polar-Polar Diblock copolymer via Vinyl-Terminated Pololefins

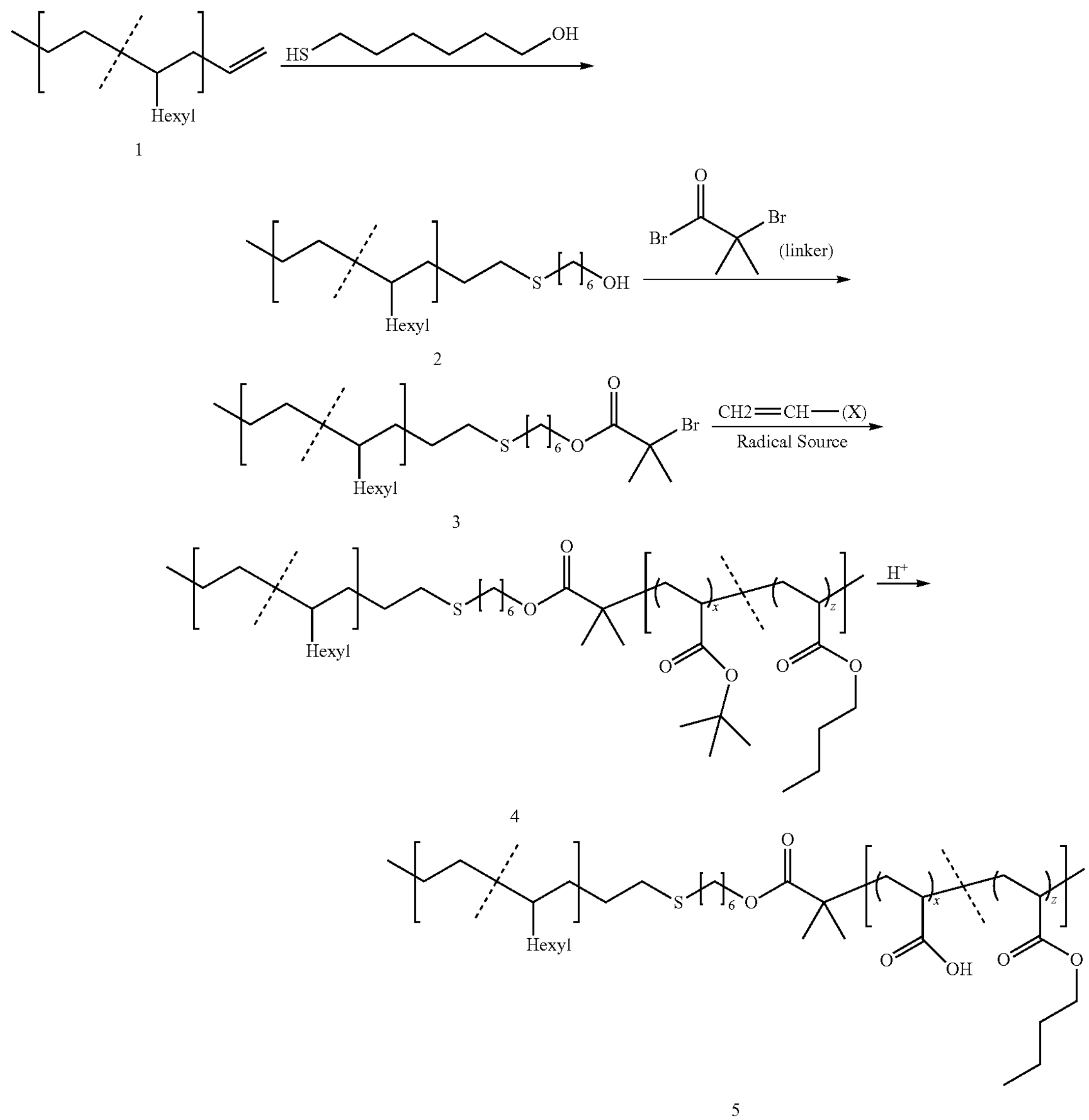

1

2

3

4

5

The phrase “reversible-deactivation radical polymerization” refers to a radical polymerization reaction controlled by a radical reagent. The radical reagent affects the rate of polymer propagation and site of polymer propagation. Reversible-deactivation radical polymerization differs from conventional radical polymerization because of the ability of a metal complex to control the steady-state concentration of propagating radicals. By controlling the concentration of the propagating radicals, the rate of termination by combination of propagating radicals is disproportionate to the rate of propagation. By controlling the rate and placement of radical propagation, the amount of branching is controlled.

In one or more embodiments, the methods of this disclosure further include reacting the non-polar—polar diblock copolymer under thermal or acidic conditions to form non-polar—polar acid diblock copolymer. The non-polar—polar acid diblock copolymer is Compound as illustrated in Scheme 1. Reacting the non-polar—polar diblock copolymer under thermal or acidic conditions removes the tert-butyl group from the units derived from tert-butyl acrylate monomers in the non-polar—polar diblock copolymer. The phrase “thermal conditions” refers to the amount of energy (i.e. heat) necessary in an endothermic reaction to result in the reaction products. In some embodiments, the thermal conditions include a temperature greater than 20° C. In various embodiment, the thermal conditions includes temperatures from greater than 30° C., greater than 40° C., or greater than 50° C. In other embodiments, the thermal conditions include a temperature of from 20° C. to 190° C.

As shown in Scheme 1, in some embodiments, the thiol compound includes a thiol group (—SH) and a terminal hydroxyl group (—OH). In other embodiments, the thiol group includes a thiol group and a protected terminal amine —(NHR). Terminal amines are reactive with many groups, including a vinyl group. To prevent the terminal amine from reacting with the vinyl group in the vinyl-terminal polyolefin (for example Compound 1) instead of with the thiol group, the terminal amine may include a protecting group. Because the protecting group is not considered to alter the "terminal functionality" of the terminal amine, as used herein, unless clearly stated to the term "terminal amine" is considered to encompass a terminal amine with a protecting group.

In some embodiments, the thiol compound has a structure according to formula (I):

(I)

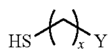

In formula (I), subscript x is 2 to 12; and Y is —$NHR^B$ or —OH, wherein $R^B$ is a protecting group. The protecting group may be derived from BOC-anhydride (di-tert-butyl dicarbonate) to from a BOC-protected amine (—NHBOC). In one or more embodiments, the terminal amine protecting group may include FMOC (9-fluorenylmethyl carbamate), BOC (t-butyl carbamate), Cbz (benzyl carbamate), trifluoroacetamide, and phthalimide.

In some embodiments, when the thiol compound includes a protected terminal amine, the method further includes deprotecting the protected terminal amine after reacting the thiol compound with the vinyl-terminated polyolefin.

In embodiments, the thiol compound is reacted with the vinyl-terminated polyolefin to form a sulfide-containing polyolefin intermediate. In some embodiments, the thiol group (—SH) of the thiol compound reacts with the terminal vinyl group of the vinyl-terminated polyolefin to produce the sulfide-containing polyolefin intermediate.

In embodiments, the macroinitiator is produced by reacting the sulfide-containing polyolefin intermediate with a linker. In some embodiments, the macroinitiator is formed via an esterification or amidation reaction of the linker. In one or more embodiments, the linker includes an acyl halide and an alpha halogen atom on the alpha carbon relative to the acyl halide. In some embodiments, the linker includes alpha halogen atom of the linker is bromine or iodine.

In some embodiments, the linker has a structure according to formula (II):

(II)

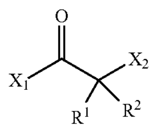

In formula (II), $X_1$ is a halogen atom, $X_2$ is chlorine, bromine or iodine. $R^1$ and $R^2$ are independently ($C_1$-$C_{20}$) hydrocarbyl. In some embodiments, $R^1$ and $R^2$ are independently ($C_1$-$C_{12}$)alkyl. In various embodiments, $R^1$ and $R^2$ are independently methyl, ethyl, propyl, n-butyl, pentyl, hexyl, heptyl, octyl, nonyl, or decyl. In one or more embodiments, $R^1$ and $R^2$ are independently —$(CH_2)_n$[($C_6$-$C_{20}$)aryl], where subscript n is 1 to 10. In some embodiments, $R^1$ and $R^2$ are independently ($C_6$-$C_{20}$)aryl.

In embodiments, the methods for preparing a non-polar—polar diblock copolymer further include reacting the macroinitiator, a radical reagent, and $CH_2$═CH—(X) monomers via a reversible-deactivation radical polymerization reaction to produce the non-polar—polar diblock copolymer. In the $CH_2$═CH—(X) monomers, X is independently —C(O)OR, —CN, or —C(O)NHR, where R is chosen from —H, linear ($C_1$-$C_{18}$)alkyl, or branched ($C_1$-$C_{18}$)alkyl.

In one or more embodiments, the acrylate monomers comprise $CH_2$═CHC(O)(OR), glycidyl acrylate, or combination thereof, where each R is chosen from —H, linear ($C_1$-$C_{18}$)alkyl, or branched ($C_1$-$C_{18}$)alkyl. In some embodiments, the acrylate monomers comprise at least one t-butyl acrylate.

In various embodiments, the radical reagent comprises CuX, Fe(III)$X_3$, and Ru(III)$X_3$ wherein each X is a ligand selected from the group consisting of 2,2':6',2"-terpyridine (tpy), 2,2'-bipyridine (bpy), 4,4'-di(5-nonyl)-2,2'-bipyridine (dNbpy), N,N,N',N'-tetramethylethylenediamine (TMEDA), N-propyl(2-pyridyl)methanimine (NPrPMI), 4,4',4"-tris(5-nonyl)-2,2':6',2"-terpyridine (tNtpy), N,N,N',N",N"-pentamethyldiethylenetriamine (PMDETA), N,N-bis(2-pyridylmethyl)octylamine (BPMOA), 1,1,4,7,10,10-hexamethyltriethylenetetramine (HMTETA), tris[2-(dimethylamino)ethyl]amine ($Me_6$TREN), tris[(2-pyridyemethyl]amine (TPMA), 1,4,8,11-tetraaza-1,4,8,11-tetramethylcyclotetradecane (Me4CYCLAM), and N,N,N',N'-tetrakis(2-pyridylmethyl)ethylenediamine (TPEN).

In one or more embodiments, the radical reagent comprises copper(I) halide, wherein the halide is bromine, chlorine, or iodine. In some embodiments, the radical reagent is copper(I) bromide.

Catalyst System

In further embodiments of this disclosure, the vinyl-terminated polyolefin is polymerized in the presence of a chain transfer agent and a catalyst system. The catalyst system includes one or more procatalyst. In these embodiments, the procatalyst becomes an active catalyst to polymerize unsaturated monomers without a co-catalyst.

In further embodiments, the catalyst system includes the procatalyst and a co-catalyst, whereby an active catalyst is formed by the combination of the procatalyst and the co-catalyst. In these embodiments, the catalyst system may include a ratio of the procatalyst to the co-catalyst of 1:2, or 1:1.5, or 1:1.2.

The catalyst system may include a procatalyst. The procatalyst may be rendered catalytically active by contacting the complex to, or combining the complex with, a metallic activator having anion of the provatalyst and a countercation. The procatalyst may be chosen from a Group IV metal—ligand complex (Group IVIS according to CAS or Group 4 according to IUPAC naming conventions), such as a titanium (Ti) metal—ligand complex, a zirconium (Zr) metal—ligand complex, or a hafnium WO metal—ligand complex. Non-limiting examples of the procatalyst include catalysts, procatalysts, or catalytically active compounds for polymerizing ethylene-based polymers are disclosed in one or more of U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; or WO 2007136496, all of which documents are incorporated herein by reference in their entirety.

Suitable procatalysts include but are not limited to those disclosed in WO 2005/090426, WO 2005/090427, WO 2007/035485, WO 2009/012215, WO 2014/105411, WO 2017/173080, U.S. Patent Publication Nos. 2006/0199930, 2007/0167578, 2008/0311812, and U.S. Pat. Nos. 7,858,706 B2, 7,355,089 B2, 8,058,373 B2, and 8,785,554 B2. With reference to the paragraphs below, the term "procatalyst" is interchangeable with the terms "catalyst," "precatalyst," "catalyst precursor," "transition metal catalyst," "transition metal catalyst precursor," "polymerization catalyst," "polymerization catalyst precursor," "transition metal complex," "transition metal compound," "metal complex," "metal compound," "complex," and "metal-ligand complex," and like terms.

In one or more embodiments, the Group IV metal-ligand procatalyst complex includes a bis(phenylphenoxy) Group IV metal-ligand complex or a constrained geometry Group IV metal-ligand complex.

According to some embodiments, the Group IV metal-ligand procatalyst complex may include a bis(phenylphenoxy) compound according to formula (X):

(X)

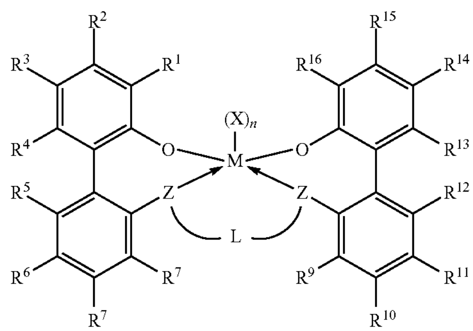

In formula (X), M is a metal chosen from titanium, zirconium, or hafnium, the metal being in a formal oxidation state of +2, +3, or +4. Subscript n of (X) n is 0, 1, or 2. When subscript n is 1, X is a monodentate ligand or a bidentate ligand, and when subscript n is 2, each X is a monodentate ligand. L is a diradical selected from the group consisting of $(C_1\text{-}C_{40})$hydrocarbylene, $(C_1\text{-}C_{40})$heterohydrocarbylene, $—Si(R^C)_2—$, $—Si(R^C)_2OSi(R^C)_2—$, $—Si(R^C)_2C(R^C)_2—$, $—Si(R^C)_2Si(R^C)_2—$, $—Si(R^C)_2C(R^C)_2Si(R^C)_2—$, $—C(R^C)_2\ Si(R^C)_2C(R^C)_2—$, $—N(R^N)C(R^C)_2—$, $—N(R^N)N(R^N)—$, $—C(R^C)_2N(R^N)C(R^C)_2—$, $—Ge(R^C)_2—$, $—P(R^P)—$, $—N(R^N)—$, —O—, —S—, —S(O)—, $—S(O)_2—$, $—N{=}C(R^C)—$, —C(O)O—, —OC(O)—, —C(O)N(R)—, and $—N(R^C)C(O)—$. Each Z is independently chosen from —O—, —S—, $—N(R^N)—$, or $—P(R^P)—$; $R^2$-$R^4$, $R^5$-$R^{-8}$, $R^9$-$R^{12}$ and $R^{13}$-$R^{15}$ are independently selected from the group consisting of —H, $(C_1\text{-}C_{40})$hydrocarbyl, $(C_1\text{-}C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $—N{=}C(R^C)_2$, $R^CC(O)O—$, $R^COC(O)—$, $R^CC(O)N(R)—$, $(R^C)_2NC(O)—$, and halogen. $R^1$ and $R^{16}$ are selected from radicals having formula (XI), radicals having formula (XII), and radicals having formula (XIII):

(XI)

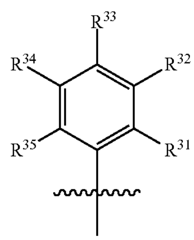

-continued (XII)

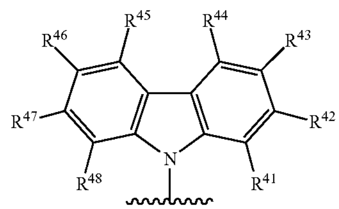

(XIII)

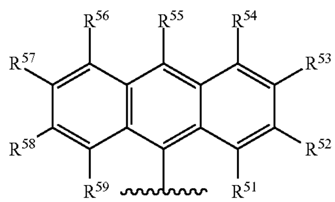

In formulas (XI), (XII), and (XIII), each of $R^{31}$-$R^{35}$, $R^{41}$-$R^{48}$, and $R^{51}$-$R^{59}$ is independently chosen from —H, $(C_1\text{-}C_{40})$hydrocarbyl, $(C_1\text{-}C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^C)_2\ NC(O)—$, or halogen.

In one or more embodiments, each X can be a monodentate ligand that, independently from any other ligands X, is a halogen, unsubstituted $(C_1\text{-}C_{20})$hydrocarbyl, unsubstituted $(C_1\text{-}C_{20})$hydrocarbylC(O)O—, or $R^KR^LN—$, wherein each of $R^K$ and $R^L$ independently is an unsubstituted $(C_1\text{-}C_{20})$hydrocarbyl.

Illustrative bis(phenylphenoxy) metal-ligand complexes according to formula (X) include, for example:

(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9H-yl)-3'-chloro-5-(2,4,4-trimethylpentan-2-yl)biphenyl-2-01)dimethyl-hafnium;

(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;

(2',2"(propane-1,3-diylbis(oxy))bis(5'-cyan-3(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2'2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;

(2',2"(propane-1,3-diylbis(oxy)bis(3-(3,6-di-tert-butyl-9H-carbazol-9-yl)-5'-fluoro-3'-methyl-5-(2,4,4-trimethylpentan-2-yl)biphenyl-2-61)dimethyl-hafnium;

(2',2"-(propane-1,3-diylbis(oxy))bis(3-(9H-carbazol-9-yl)-5'-chloro-3'-methyl-5'-(2,4,4-trimethylpentan-2-yl)biphenyl-2-ol)dimethyl-hafnium;

(2'2"-(propane-1,3-diylbis(oxy))bis(3(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium;

(2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol)dimethyl-hafnium;

(2'2"-(2,2-dimethyl-2-silapropane-1-diylbis(oxy)bis(3'-5'-chloro-3-(3,6-di-tert-butyl-9-carbazol-9-yl-3'-methyl-5-(2,4,4-trimethylpentan-2-yl)biphenyl-2-ol)dimethyl-hafnium;

(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;

(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium;

(2',2"-(propane-1,3-diylbis(oxy))bis(3-(3,6-di-tert-butyl-9H-carbazol-9-yl)-3'-5'-dichloro-5-(2,4,4-trimethylpentan-2-yl)biphenyl-2-ol)dimethyl-titanium: and (2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium.

Other bis(phenylphenoxy) metal-ligand complexes that may be used in combination with the metallic activators in the catalyst systems of this disclosure will be apparent to those skilled in the art.

According to some embodiments, the Group IV metal—ligand complex may include a cyclopentadienyl procatalyst according to formula (XIV):

$Lp_iMX_mX'_nX"_p$, or a dimer thereof (XIV).

In formula (XIV), Lp is an anionic, delocalized, π-bonded group that is bound to M, containing up to 50 non-hydrogen atoms. In some embodiments of formula (XIV), two Lp groups may be joined together forming a bridged structure, and further optionally one Lp may be bound to X.

In formula (XIV), M is a metal of Group 4 of the Periodic Table of the Elements in the +2, +3 or +4 formal oxidation state. X is an optional, divalent substituent of up to 50 non-hydrogen atoms that together with Lp forms a metallocycle with M. X' is an optional neutral ligand having up to 20 non hydrogen atoms; each X" is independently a monovalent, anionic moiety having up to 40 non-hydrogen atoms. Optionally, two X" groups may be covalently bound together forming a divalent dianionic moiety having both valences bound to M, or, optionally two X" groups may be covalently bound together to form a neutral, conjugated or nonconjugated diene that is π-bonded to M, in which M is in the +2 oxidation state. In other embodiments, one or more X" and one or more X' groups may be bonded together thereby forming a moiety that is both covalently bound to M and coordinated thereto by means of Lewis base functionality. Subscript i of $Lp_i$ is 0, 1, or 2; subscript n of $X'_n$ is 0, 1, 2, or 3; subscript m of $X_m$ is 0 or 1; and subscript p of $X"_p$ is 0, 1, 2, or 3. The sum of i+m+p is equal to the formula oxidation state of M.

Illustrative Group IV metal-ligand complexes may include cyclopentadienyl procatalyst that may be employed in the practice of the present invention include:

cyclopentadienyltitaniumtrimethyl; cyclopentadienyltitaniumtriethyl; cyclopentadienyltitaniumtriisopropyl;cyclopentadienyltitaniumtriphenyI;cyclopentadienyltitaniu mtribenzyl; cyclopentadienyltitanium-2,4-dimethylpentadienyl; cyclopentadienyltitanium-2,4-dimethylpentadienyl·triethylphosphine; cyclopentadienvltitanium-2,4-dimethylpentadienyl·trimethylphosphine: cyclopentadienyltitaniumdimethylmethoxide; cyclopentadienyltitaniumdimethylchloride: pentamethylcyclopentadienyltitaniumtrimethyl; indenyltitaniumtrimethyl; indenyltitaniumtriethyl; indenyltitaniumtripropyl; indenyIltitaniunriphenyl;tetrahydroindenyltitaniumtribenzyl; pentamethylcyclopentadienyltitaniumtriisopropyl; penmamethylcyclopentadienyltitaniumtribenzyl; pentamethylcyclopentadienyltitaniumdimethylmethoxide; pentamethylcyclopentadienylkitaniumdimethylchloride; bis($\eta^5$-2,4-dimethylpentadienyl)titanium; bis($\eta^5$-2,4-dimethylpentadienyl)titanium·trimethylphosphine; bis ($\eta^5$-2,4-dimethylpentadienyl)titanium-triethylphosphine; octahydrofluorenyltitaniumtrimethyl; tetrahydroindenyltitaniumtrimethyl; tetrahydrotluorenyltitaniumtrimethyl; (tert-butylamido)(1,1-dimethyl-2,3,4,9,10-η-1,4,5,6,7,8-hexahydronaphthalenyl) dimethylsilanetitaniumdimethyl: (tert-butylamido)(1,1,2,3-tetramethyl-2,3,4,9,10-η-1,4,5,6,7,8-hexahydronaphthalenyl)dimethylsilanetitaniumdimethyl: (tert-butylamido)(tetramethyl-$\eta^5$-cyclopentadienyl) dimethylsilanetitanium dibenzyl; (tert-butylamido)(tetramethyl-$\eta^5$-cyclopentadienyl)dimethylsilanetitanium dimethyl; (tert-butylamido)(tetramethyl-$\eta^5$-cyclopentadienyl)-1,2-ethanediyltitanium dimethyl; (tert-butylamido)(tetramethyl-$\eta^5$-indenyl) dimethylsilanetitanium dimethyl; (tert-butylanido) (tetramethyl-$\eta^5$-cyclopentadienyl)dimethylsilane titanium (III) 2-(dimethylamino)benzyl; (tert-butylamido) (tetramethyl-$\eta^5$-cyclopentadienyl)dimethylsilanetitanium (III) allyl: (tert-butylamido)(tetramethyl-$\eta^5$-cyclopentadienyl)dimethylsilanetitanium (III) 2,4-dimethylpentadienyl: (tert-butylamido)(tetramethyl-$\eta^5$-cyclopentadienyl) dimethylsilanetitanium (II) 1,4-diphenyl-1,3-butadiene; (tert-butylamido)(tetramethyl-$\eta^5$-cyclopentadienyl)dimethylsilanetitanium (II) 1,3-pentadiene; (tert-butylamido)(2-methylindcnyl)dimethylsilanctitanium (II) 1,4-diphenyl-1,3-butadiene: (tert-butylamido)(2-methylindenyl) dimethylsilanctitanium (II) 2,4-hexadiene: (tert-butylamido)(2-methylindenyl)dimethylsilanctitanium (IV) 2,3-dimethyl-1,3-butadiene; (tert-butylamido)(2-methylindenyl)dimethylsilanetitanium (IV) isoprene; (tert-butylamido)(2-methylindenyl)dimethylsilanetitanium (IV) 1,3-butadiene: (tert-butylamido)(2,3-dimethylindenyl)dimethylsilanetitanium (IV) 2,3-dimethyl-1,3-butadiene; (tert-butylamido)(2,3-dimethylindenyl) dimethylsilanetitanium (IV) isoprene; (tert-butylamido) (2,3-dimethylindenyl)dimethylsilanctitanium (IV) dimethyl; (tert-butylamido)(2,3-dimethylindenyl)dimethylsilanctitanium (IV) dibenzyl; (tert-butylamido)(2,3-dimethylindenyl)dimethylsilanetitanium (IV) 1,3-butadiene; (tert-butylamido)(2,3-dimethylindenyl) dimethylsilanetitanium (II) 1,3-pentadiene; (tert-butylamido)(2,3-dimethylindenyl)dimethylsilanetitanium (II) 1,4-diphenyl-1,3-butadiene; (tert-butylamido)(2-methylindenyl)dimethylsilanetitanium (II) 1,3-pentadiene; (tert-butylamido)(2-methylindenyl)dimethylsilanetitanium (IV) dimethyl; (tert-butylamido)(2-methylindenyl)dimethylsilanetitanium (IV) dibenzyl, (tert-butylamido)(2-methyl-4-phenylindcnyl)dimethylsilanctitanium (II) 1,4-diphenyl-1,3-butadiene: (tert-butylamido)(2-methyl-4-phenylindenyl)dimethylsilanetitanium (II) 1,3-pentadiene; (tert-butylamido)(2-methyl-4-phenylindenyl)dimethylsilanctitanium (II) 2,4-hexadiene; (tert-butylamido)(tetramethyl-$\eta^5$-cyclopentadienyl) dimcthyl-silanetitanium (IV) 1,3-butadiene: (tert-butylamido)(tetramcthyl-$\eta^5$-cyclopentadienyl)dimethylsilanetitanium (IV) 2,3-dimethyl-1,3-butadiene; (tert-butylamido)(tetramethyl-$\eta^5$-cyclopentadienyl) dimethylsilanetitanium (IV) isoprene; (tert-butylamido)(tetramethyl-$\eta^5$-cyclopentadienyl)dimethyl-silanetitanium (II) 1,4-dibenzyl-1,3-butadiene; (tert-butylamido)(tetramethyl-$\eta^5$-cyclopentadienyl) dimethylsilanetitanium (II) 2,4-hexadiene; (tert-butylamido)(tetramethyl-$\eta^5$-cyclopentadienyl)dimethyl-silanetitanium (II) 3-methyl-1,3-pentadiene; (tert-butylamido)(2,4-dimethylpentadien-3-yl) dimethylsilanetitaniundimethyl; (tert-butylamido)(6,6-dimethylcyclohexadienyl) dimethylsilanetitaniumdimethyl; (tert-butylamido)(1,1-dimethyl-2,3,4,9,10-$\eta$-1,4,5,6,7,8-hexahydronaphthalen-4-yl)dimethylsilanetitaniumdimethyl; (tert-butylamido)(1,1,2,3-tetramethyl-2,3,4,9,10-$\eta$-1,4,5,6,7,8-hexahydronaphthalen-4-yl) dimethylsilanetitaniumdimethyl; (tert-butylamido)(tetramethyl-$\eta^5$-cyclopentadienyl methylphenylsilanetitanium (IV) dimethyl; (tert-butylamido)(tetramethyl-$\eta^5$-cyclopentadienyl methylphenyl-silanetitanium (II) 1,4-diphenyl-1,3-butadiene; 1-(tert-butylamido)-2-(tetramethyl-$\eta^5$-cyclopentadienyl) ethanediyltitanium (IV) dimethyl; 1-(tert-butylamido)-2-(tetramethyl-$\eta^5$-cyclopentadienyl)ethanediyl-titanium (II) 1,4-diphenyl-1,3-butadiene;

Each of the illustrative cyclopentadienyl procatalyst may include zirconium or hafnium in place of the titanium metal centers of the cyclopentadienyl procatalyst.

Other procatalysts, especially procatalysts containing other Group IV metal-ligand complexes, will be apparent to those skilled in the art.

Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably, the catalysts for use herein are homogeneous catalysts comprising a relatively pure organometallic compound or metal complex, especially compounds or complexes based on metals selected from Groups 3-10 or the Lanthanide series of the Periodic Table of the Elements.

Metal complexes for use herein may be selected from Groups 3 to 15 of the Periodic Table of the Elements containing one or more delocalized, $\pi$-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-10, and most preferably Group 4 of the Periodic Table of the Elements; K independently at each occurrence is a group containing delocalized $\pi$-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X; X independently at each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto; or two X groups together form a divalent anionic ligand group of up to 40 non-hydrogen atoms or together are a conjugated diene having from 4 to 30 non-hydrogen atoms bound by means of delocalized $\pi$-electrons to M, whereupon M is in the +2 formal oxidation state, and Z independently at each occurrence is a neutral, Lewis base donor ligand of up to 50 non-hydrogen atoms containing at least one unshared electron pair through which Z is coordinated to M; k is an integer from 0 to 3; x is an integer from 1 to 4; z is a number from 0 to 3; and the sum, k+x, is equal to the formal oxidation state of M.

Suitable metal complexes include those containing from 1 to 3 $\pi$-bonded anionic or neutral ligand groups, which may be cyclic or non-cyclic delocalized $\pi$-bonded anionic ligand groups. Exemplary of such $\pi$-bonded groups are conjugated or nonconjugated, cyclic or non-cyclic diene and dienyl groups, allyl groups, boratabenzene groups, phosphole, and arene groups. By the term "$\pi$-bonded" is meant that the ligand group is bonded to the transition metal by a sharing of electrons from a partially delocalized $\pi$-bond.

Each atom in the delocalized 7-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition, two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, $\pi$-bonded group, or hydrocarbyl-substituted heteroatom.

Examples of suitable anionic, delocalized $\pi$-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_1$-10 hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(1)phenanthren-1-yl, and tetrahydroindenyl.

More specifically this class of Group 4 metal complexes used according to the present invention includes "constrained geometry catalysts" corresponding to the formula:

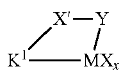

In the previous formula, M is titanium or zirconium, preferably titanium in the +2, +3, or +4 formal oxidation state; $K^1$ is a delocalized, π-bonded ligand group optionally substituted with from 1 to 5 $R^2$ groups, $R^2$ at each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, heterohydrocarbyl, hydrocarbyloxy or silyl group, said group having up to 20 non-hydrogen atoms, or two X groups together form a neutral $C_{5-30}$ conjugated diene or a divalent derivative thereof; x is 1 or 2; Y is —O—, —S—, —NR'—, —PR'—; and X' is $SiR'_2$, $CR'_2$, $SiR'_2SiR'_2$, $CR'_2CR'2$, CR'═CR', $CR'_2SiR'_2$, or $GeR'_2$, wherein R' independently at each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

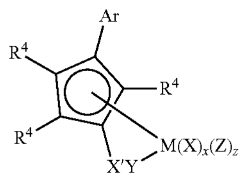

In the previous formula, Ar is an aryl group of from 6 to 30 atoms not counting hydrogen; $R^4$ independently at each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl) amino-substituted hydrocarbyl, di(hydrocarbyl)amino-substituted hydrocarbyl, hydrocarbyleneamino-substituted hydro carbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group; M is titanium; X' is $SiR^6_2$, $CR^6_2$, $SiR^6_2SiR^6_2$, $CR^6_2CR^6_2$, $CR^6$═$CR^6$, $CR^6_2SiR^6_2$, $BR^6$, $BR^6L''$, or $GeR^6_2$; Y is —O—, —S—, —$NR^5$—, —$PR^5$—; —$NR^5_2$, or —$PR^5_2$; $R^5$, independently at each occurrence is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system; $R^6$, independently at each occurrence, is hydrogen, or a member selected from hydrocarbyl, hydrocarbyloxy, silyl, halogenated alkyl, halogenated aryl, —$NR^5_2$, and combinations thereof, said $R^6$ having up to 20 non-hydrogen atoms, and optionally, two $R^6$ groups or $R^6$ together with Z forms a ring system; Z is a neutral diene or a monodentate or polydentate Lewis base optionally bonded to $R^5$, $R^6$, or X; X is hydrogen, a monovalent anionic ligand group having up to 60 atoms not counting hydrogen, or two X groups are joined together thereby forming a divalent ligand group; x is 1 or 2; and z is 0, 1 or 2.

Additional examples of suitable metal complexes herein are polycyclic complexes corresponding to the formula:

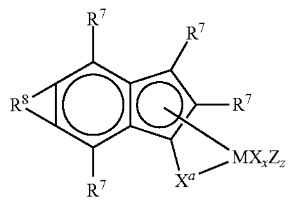

In the previous formula, M is titanium in the +2, +3 or +4 formal oxidation state; $R^7$ independently at each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative; $R^8$ is a divalent hydrocarbylene- or substituted hydrocarbylene group forming a fused system with the remainder of the metal complex, said $R^8$ containing from 1 to 30 atoms not counting hydrogen; $X^a$ is a divalent moiety, or a moiety comprising one n-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen; X is a monovalent anionic ligand group having up to 60 atoms exclusive of the class of ligands that are cyclic, delocalized, n-bound ligand groups and optionally two X groups together form a divalent ligand group; Z independently at each occurrence is a neutral ligating compound having up to 20 atoms; x is 0, 1 or 2; and z is zero or 1.

Suitable complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Suitable metal complexes correspond to the formula:

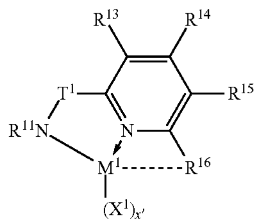

In the previous formula, $M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively.

Suitable examples of the foregoing metal complexes correspond to the formula:

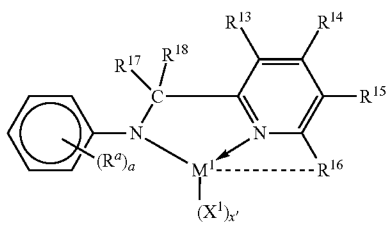

In the previous formula, $M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl; $R^a$ independently at each occurrence is $C_{1-4}$ alkyl, and a is 1-5, most preferably $R^a$ in two ortho-positions to the nitrogen is isopropyl or t-butyl; $R^{17}$ and $R^{18}$ independently at each occurrence are hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and bonds, optional bonds and electron pair donative interactions are represented by lines, dotted lines and arrows respectively.

Exemplary metal complexes for use herein as catalysts correspond to the formula:

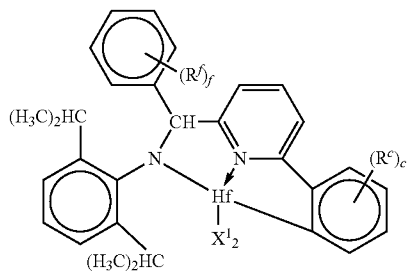

In the formula, $X^1$ at each occurrence is halide, N,N-dimethylamido, or $C_{1-4}$ alkyl, and preferably at each occurrence $X^1$ is methyl; R f independently at each occurrence is hydrogen, halogen, $C_{1-20}$ alkyl, or $C_{6-20}$ aryl, or two adjacent R f groups are joined together thereby forming a ring, and f is 1-5; and $R^c$ independently at each occurrence is hydrogen, halogen, $C_{1-20}$ alkyl, or $C_{6-20}$ aryl, or two adjacent $R^c$ groups are joined together thereby forming a ring, and c is 1-5.

Suitable examples of metal complexes for use as catalysts include the following formulas:

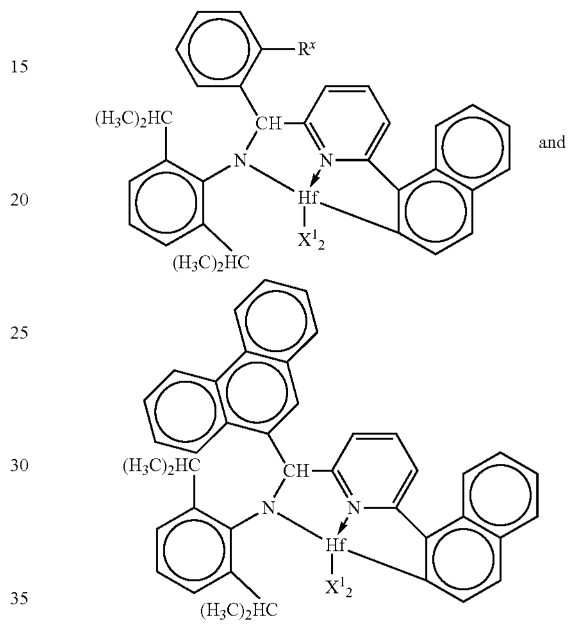

and

In the previous formula, $R^x$ is $C_{1-4}$ alkyl or cycloalkyl, preferably methyl, isopropyl, t-butyl or cyclohexyl; and $X^1$ at each occurrence is halide, N,N-dimethylamido, or $C_{1-4}$ alkyl, preferably methyl.

Examples of metal complexes usefully employed as catalysts according to the present invention include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)]hafnium dimethyl;

[N-(2,6-di(1-methylethyl)phenyl)amido)(2-isopropylphenyl)(α-naphthalen-2-diyl(6-pyridin-2-diyl)methane)]hafnium di(N,N-dimethylamido);

[N-(2,6-di(1-methylethyl)phenyl)amido)(2-isopropylphenyl)(α-naphthalen-2-diyl(6-pyridin-2-diyl)methane)]hafnium dichloride;

[N-(2,6-di(1-methylethyl)phenyl)amido)(phenanthren-5-yl)(α-naphthalen-2-diyl(6-pyridin-2-diyl)methane)]hafhium dimethyl;

[N-(2,6-di(1-methylethyl)phenyl)amido)(phenanthren-5-yl)(α-naphthalen-2-diyl(6-pyridin-2-diyl)methane)]hafhium di(N,N-dimethylamido); and

[N-(2,6-di(1-methylethyl)phenyl)amido)(phenanthren-5-yl)($\alpha$-naphthalen-2-diyl(6-pyridin-2-diyl)methane)]hafnium dichloride.

Under the reaction conditions used to prepare the metal complexes used in the present disclosure, the hydrogen of the 2-position of the $\alpha$-naphthalene group substituted at the 6-position of the pyridin-2-yl group is subject to elimination, thereby uniquely forming metal complexes wherein the metal is covalently bonded to both the resulting amide group and to the 2-position of the $\alpha$-naphthalenyl group, as well as stabilized by coordination to the pyridinyl nitrogen atom through the electron pair of the nitrogen atom.

Further procatalysts that are suitable include imidazole-amine compounds corresponding to those disclosed in WO 2007/130307A2, WO 2007/130306A2, and U.S. Patent Application Publication No. 20090306318A1, which are incorporated herein by reference in their entirety. Such imidazole-amine compounds include those corresponding to the formula:

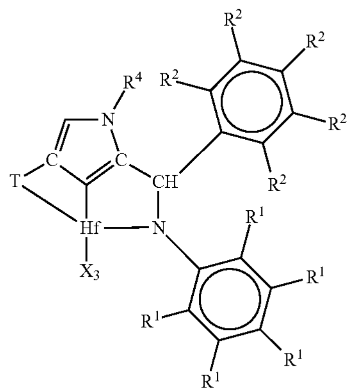

In the imidazole-amine compounds, X independently each occurrence is an anionic ligand, or two X groups together form a dianionic ligand group, or a neutral diene; T is a cycloaliphatic or aromatic group containing one or more rings; $R^1$ independently each occurrence is hydrogen, halogen, or a univalent, polyatomic anionic ligand, or two or more $R^1$ groups are joined together thereby forming a polyvalent fused ring system; $R^2$ independently each occurrence is hydrogen, halogen, or a univalent, polyatomic anionic ligand, or two or more $R^2$ groups are joined together thereby forming a polyvalent fused ring system; and $R^4$ is hydrogen, alkyl, aryl, aralkyl, trihydrocarbylsilyl, or trihydrocarbylsilylmethyl of from 1 to 20 carbons.

Further examples of such imidazole-amine compounds include but are not limited to the following:

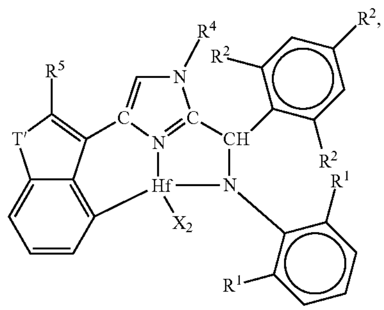

-continued

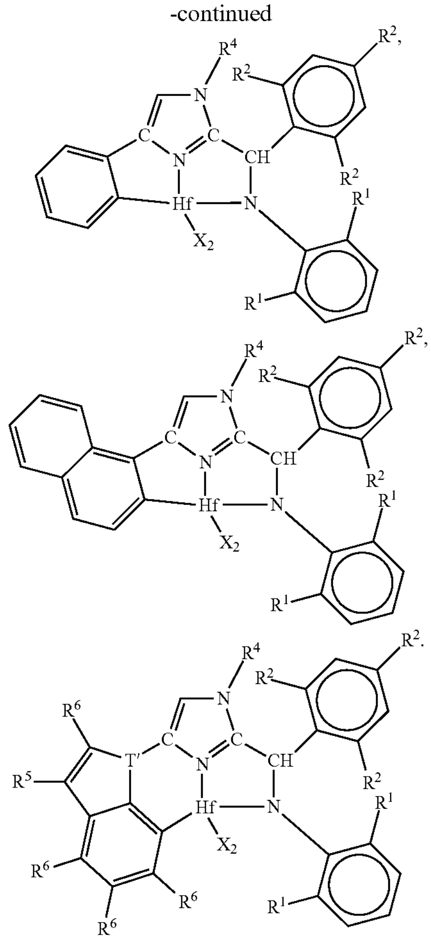

In the imidazole-amine compounds, $R^1$ independently each occurrence is a $C_3$-12 alkyl group wherein the carbon attached to the phenyl ring is secondary or tertiary substituted; $R^2$ independently each occurrence is hydrogen or a $C_{1-2}$ alkyl group; $R^4$ is methyl or isopropyl; $R^5$ is hydrogen or $C_1$-6 alkyl; $R^6$ is hydrogen, $C_{1-6}$ alkyl or cycloalkyl, or two adjacent $R^6$ groups together form a fused aromatic ring; T' is oxygen, sulfur, or a $C_{1-20}$ hydrocarbyl-substituted nitrogen or phosphorus group; T" is nitrogen or phosphorus; and X is methyl or benzyl.

The catalyst systems of this disclosure may include co-catalysts or activators in addition to the ionic metallic activator complex having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1{}_2AlOT^2$ or $T^1{}_1Al(OT^2)_2$ wherein is a secondary or tertiary $(C_3$-$C_6)$alkyl, such as isopropyl, isobutyl or tert-butyl; and $T^2$ is a alkyl substituted $(C_6$-$C_{30})$aryl radical or aryl substituted $(C_1$-$C_{30})$alkyl radical, such as 2,6-di(tert-butyl)-4- methylphenyl, 2,6-di(tert-butyl)-4-methylphenyl, 2,6-di (tert-butyl)-4-methyltolyl, or 4-(3',5'-di-tert-butyltolyl)-2,6-di-tert-butylphenyl.

Additional examples of aluminum compounds include $[C_6]$trialicyl aluminum compounds, especially those wherein the alkyl groups are ethyl, propyl, isopropyl, n-butyl, isobutyl, pentyl, neopentyl, or isopentyl, dialkyl (aryloxy)aluminum compounds containing from 1-6 carbons in the alkyl group and from 6 to 18 carbons in the aryl group (especially (3,5-di(t-butyl)-4-Methylphenoxy)diisobutylaluminum), methylalumoxane, modified methylalumoxane and diisobutylalumoxane.

In the catalyst systems according to embodiments of this disclosure, the molar ratio of the ionic metallic activator complex to Group IV metal—ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more ionic metallic activator complexes described in this disclosure.

Ethylene-Based Polymer

The catalytic systems described in the preceding paragraphs are utilized in the polymerization of olefins. Ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 0.50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 mol % monomer units derived from ethylene; or from 50 to 100 mol % monomer units derived from ethylene; or from 80 to 100 mol % units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the ethylene-based polymers may comprise an amount of $(C_3-C_{20})$α-olefin. The amount of $(C_3-C_{20})$α-olefin is less than 50 mol %. In some embodiments, the ethylene-based polymer may include at least 0.5 mol % to 25 mol % of $(C_3-C_{20})$α-olefin; and in further embodiments, the ethylene-based polymer may include at least 5 mol % to 10 mol %. In some embodiments, the additional α-olefin is 1-octene.

Any conventional polymerization process, in combination with a catalyst system according to this disclosure may be used to produce the ethylene-based polymers. Such conventional polymerization processes include, but are not limited to, solution polymerization processes, gas-phase polymerization processes, slurry-phase polymerization processes, and combinations thereof using one or more conventional reactors such as loop reactors, isothermal reactors, fluidized-bed gas-phase reactors, stirred-tank reactors, batch reactors in parallel, series, or any combinations thereof, for example.

In one embodiment, ethylene-based polymer may be produced via solution polymerization in a dual reactor system, for example a dual-loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual-loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual-loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single-loop reactor system, in which ethylene and optionally one or more α-olefins are polymerized in the presence of the catalyst system, as described within this disclosure.

The polymer process may further include incorporating one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by weight of the total amount of such additives, based on the weight of the ethylene-based polymers and the one or more additives. The ethylene-based polymers may further comprise fillers, which may include, but are not limited to, organic or inorganic tillers. The ethylene-based polymers may contain from about to about 20 weight percent fillers such as, for example, calcium carbonate, talc, or $Mg(OH)_2$, based on the combined weight of the ethylene-based polymers and all additives or tillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal—ligand complex and an ionic metallic activator complex and, optionally a scavenger. The polymer resulting from such a catalyst system that incorporates the metal—ligand complex and the ionic metallic activator complex may have a density according to ASTM D792 (incorporated herein by reference in its entirety) from 0.850 g/cm³ to 0.950 g/cm³, from 0.870 g/cm³ to 0.920 g/cm³, from 0.870 g/cm³ to g/cm³, or from 0.870 g/cm³ to 0.900 g/cm³, for example.

In another embodiment, the polymer resulting from the catalyst system that includes the metal—ligand complex and an ionic metallic activator complex has a melt flow ratio $(I_{10}/I_2)$ from 5 to 15, in which melt index 12 is measured according to ASTM D1238 (incorporated herein by reference in its entirety) at 190° C. and 2.16 kg load, and melt index $I_{10}$ is measured according to ASTM D1238 at 190° C.

and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal—ligand complex and the ionic metallic activator complex has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Batch Reactor Procedure

A 2 L Parr reactor was used for all polymerization experiments. The reactor was heated via an electrical heating mantle and was cooled via an internal serpentine cooling coil containing water. Both the reactor and the heating/cooling system were controlled and monitored by a Camile TG process computer. All chemicals used for polymerization or catalyst makeup were run through purification columns. 1-octene, toluene, and Isopar-E (a mixed alkanes solvent available from ExxonMobil, Inc.) were passed through 2 columns, the first containing A2 alumina, and the second containing Q5 reactant (available from Engelhard Chemicals Inc.). Ethylene gas was passed through 2 columns, the first containing A204 alumina and activated 4 Å molecular sieves, the second containing Q5 reactant. Hydrogen gas was passed through Q5 reactant and A2 alumina. Nitrogen gas was passed through a single column containing A204 alumna, activated 4 Å molecular sieves and Q5 reactant. Catalyst and cocatalyst (also called the activator) solutions were handled in a nitrogen-filled glovebox.

The load column was filled with Isopar-E to the load setpoints by use of an Ashcroft differential pressure cell, and the material was transferred into the reactor. 1-octene was measured by syringe and added via the shot tank due to low amount used. Once complete, the reactor immediately begins heating toward the reaction setpoint. Scavenger (MMAO-3A, 20 μmol) solution was added to the reactor via the shot tank once 25 degrees prior to the setpoint. Next, chain transfer agent (typically tri-n-octylaluminum) was added to the reactor via the shot tank. At 10 degrees prior to reaching the setpoint, ethylene was added to the specified pressure as monitored via a micro-motion flow meter. Finally, at this same time, dilute toluene solutions of catalyst and cocatalyst (as specified) were mixed, transferred to the shot tank, and added to the reactor to begin the polymerization reaction. The polymerization conditions were typically maintained with supplemental ethylene added on demand to maintain the specified pressure until an ethylene uptake of 20 g was achieved. Exothermic heat was continuously removed from the reaction vessel via the internal cooling coil. After the desired ethylene uptake was reached, the reactor was heated to 200° C., a process which required approximately 20 min. Once at temperature, the reactor was held at 200° C. for an additional 20 min to allow for elimination of polymeryl chains from in situ generated polymeryl aluminum to yield a solution of vinyl-terminated ethylene/1-octene copolymer. The resulting solution was removed from the reactor without the addition of the typical antioxidant package (Irganox 1010 and Irgafos 168). Polymers were recovered by evaporating in a hood overnight and then drying for about 12 h in a temperature-ramped vacuum oven with a final set point of 140° C.

Between polymerization runs, at least one wash cycle was conducted in which Isopar-E (850 g) was added and the reactor was heated to a setpoint between 160° C. and 190° C. The reactor was then emptied of the heated solvent immediately before beginning a new polymerization run.

EXAMPLES

Reaction Sequences A to H are illustrative of the synthetic procedure for the polymerization process as shown in Scheme 1. In each reaction sequence, the vinyl-terminated polyolefin is different. Each vinyl-terminated polyolefin varies based on molecular weight and the units derived from the comonomer incorporation. One or more features of the present disclosure are illustrated in view of the examples as follows:

In Reaction Sequence A to C, the vinyl-terminated polyolefin had a low molecular weight. In Reaction Sequence D, the vinyl-terminated polyolefin had a very low molecular weight. In Reaction Sequence E to G, the vinyl-terminated polyolefin had a high molecular weight. In Reaction Sequence H, the thiol compound was 2-(BOC-amino)ethanethiol.

Example 1—Synthesis of Vinyl-Terminated Polyolefins (Vinyl Terminated Polyolefin 1, 2, 3, 4, 5, 6, and 7) Via Trialkyl Aluminum Chain-Transfer Agents

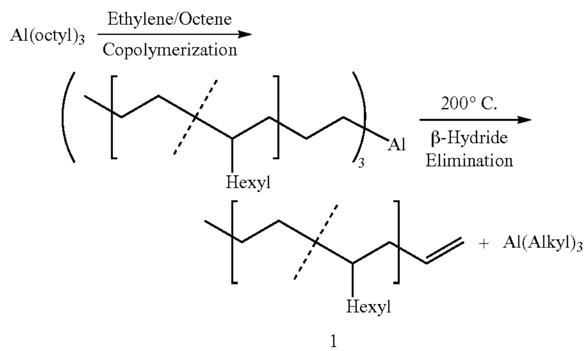

1

To synthesize the vinyl-terminated polyolefin, ethylene and optionally octene were polymerized in the presence of $Al(octyl)_3$ and Procatalyst 1 or Procatalyst 2. The alkyl aluminum functioned as a chain-transfer agent that resulted in the formation of polymeryl aluminum species. After the olefin polymerization stage, the reaction mixture was heated in the presence of excess ethylene and octene to obtain predominantly vinyl-terminated polymer and trialkyl aluminum at equilibrium.

Procatalyst 1

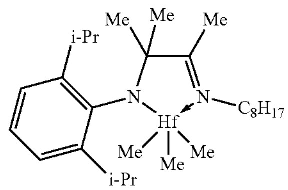

-continued

Procatalyst 2

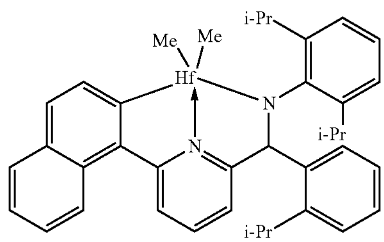

The results summarized in Table 1 provide the molecular weight of the produced vinyl-terminated polyolefin expressed as $M_n$, effective as determined by $^1H$ NMR. To obtain the $M_n$ effective, the number of vinyl groups was normalized to 1, and the molecular weight contributions from the vinyl group (27 g/mol), aliphatic/polyolefin protons (2H=14 g/mol), and any other identifiable functional groups was totaled. It was assumed that all vinyl groups were attached to a polymer and all polymers have exactly 1 vinyl group. Using $M_{n,\ effective}$ allowed for a single value to express the molecular weight, while giving the correct concentration of functional groups for the purposes of reaction stoichiometry. In Table 1, there are only significant discrepancies between $M_{n,effective}$ and the GPC $M_n$ for the higher MW polymers, where chain-end functionality is lower.

-continued

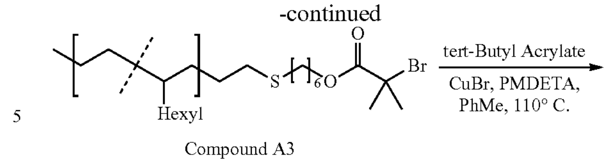

Compound A3

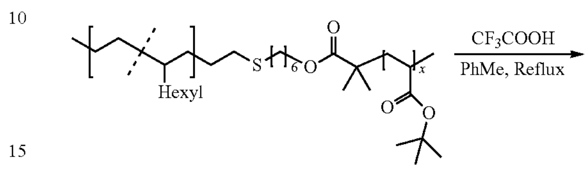

Compound A4

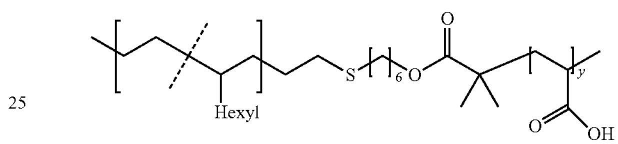

Compound A5

TABLE 1

End-functional polyolefins synthesized in the batch reactor and used in synthesis of diblock copolymers.

| Vinyl-terminated polyolefin — | Procat. — | $M_n$ (GPC) [kDa] | Đ (GPC) — | $T_m$ (DSC) [° C.] | $M_{n,effective}$[a] ($^1H$ NMR) [kDa] | End-Functional Chains[b] [%] | Vinyl[c] [%] | Octene [mol %] |
|---|---|---|---|---|---|---|---|---|
| 1 | Procat. 1 | 1.3 | 1.37 | 120 | 1.7 | 94.0 | 93.5 | — |
| 2 | Procat. 1 | 4.0 | 1.46 | 124 | 4.2 | 91.1 | 93.6 | 0.77 |
| 3 | Procat. 1 | 7.5 | 1.47 | 124 | 7.5 | 87.8 | 92.8 | 0.85 |
| 4 | Procat. 1 | 7.1 | 1.61 | 123 | 7.2 | 88.2 | 92.8 | 0.93 |
| 5 | Procat. 1 | 1.2 | 1.31 | 117 | 1.5 | 95.0 | 91.7 | — |
| 6 | Procat. 2 | 18.6 | 3.66 | 124 | 25.8 | 80 ± 8 | 92.6 | 0.57 |

[a]Defined as the $M_n$ of the polymer if all chains were terminated with exactly 1 vinyl group as determined by $^1H$ NMR (see text for discussion).
[b]The percent of chains that have one saturated (methyl) end-group and one unsaturated (olefinic) end-group.
[c]Percent of unsaturated chain-ends which are vinyl.

Reaction Sequence A

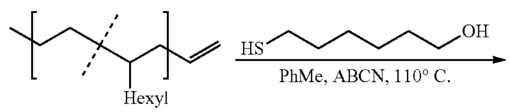

Vinyl-terminated Polyolefin 3

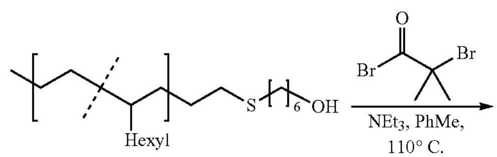

Compound A2

Synthesis of Low MW Hydroxyl-Terminated Polyolefin (Compound A2)

In a glovebox: Vinyl-terminated polyolefin 3 ($M_n$=7.5 kDa, 15.0 g, 2.0 mmol) was dissolved in 33 mL of toluene in a vented glass jar. 6-Mercaptohexanol (1.36 mL, 10.0 mmol, 5 equiv.) was added in one portion, followed by ABCN (248 mg, 1.0 mmol, 0.5 equiv.) in 2 mL of toluene. Reaction was stirred for 4 hr. at 110° C., then the reaction was removed from the glovebox. The product was precipitated into 500 mL of MeOH, filtered, and washed with an additional portion of MeOH. The product was then dried under a stream of $N_2$ overnight at 70° C. to give white polymer (14.4 g, 94% yield). $^1H$ NMR (500 MHz, 110° C., d1=70s, TCE-$d_2$) δ 3.68 (q br, J=6.1 Hz, 2H, a), 2.55 (m br, 4H, c), 1.92-0.74 (br overlapping, 1125H, Polyolefin+other aliphatic+$PE_{Me}$).

Compound A2

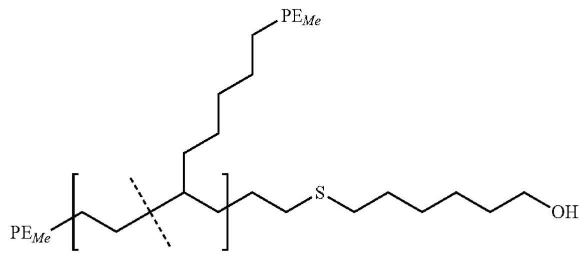

Synthesis of Low MW Macroinitiator [Compound A3]

In a glove box: Hydroxyl-terminated polyethylene (Compound A2, $M_n$=8.0 kDa, 14.0 g, 1.75 mmol —OH) was dissolved in 48 mL of toluene in a jar at reflux. Triethylamine (1.22 mL, 8.80 mmol, 5 equiv.) was added, followed by the dropwise addition of 2-bromo-2-methylpropionyl bromide (0.87 mL, 7.0 mmol, 4 equiv.) diluted with 2 mL of toluene. The reaction was allowed to reflux for 75 minutes, then removed from the glovebox, precipitated into 800 mL of MeOH, filtered, then triturated with an additional 600 mL of MeOH and filtered again. The product was dried under a stream of $N_2$ overnight at 70° C. to give tan polymer (13.7 g, 96% yield). $^1$H NMR (500 MHz, 110° C., d1=70s, TCE-$d_2$) δ 4.25 (t br, 2H, a), 2.58 (m, 4H, c), 2.01 (s, 6H, d), 1.78 (m, 2H, b), 1.67 (m, 4H, e), 1.92-0.74 (br overlapping, 1143H, Polyolefin+other aliphatic+$PE_{Me}$).

Compound A3

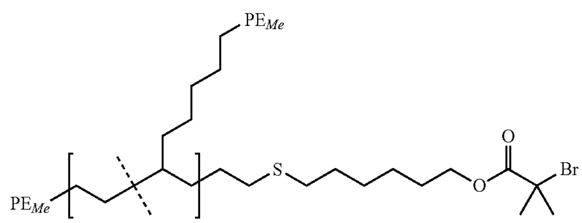

Synthesis of Low MW Polyolefin-b-Poly(tBA) [Compound A4]

In a glove box, Compound A3, ($M_n$=8.4 kDa, 12.5 g, 1.5 mmol —Br) was dissolved in mL of toluene at 110° C. Tert-butyl acrylate (5.5 mL, 38 mmol, 25 equiv.) was added and solution stirred until homogeneous. CuBr (214 mg, 1.50 mmol, 1 equiv.) and PMDETA (0.312 mL, 1.50 mmol, 1 equiv.) were added as a stock solution in benzonitrile (1.29 mL) and the reaction allowed to proceed for 1 hr. The reaction was terminated by removing from glovebox and exposing to air. The solution was diluted to 200 mL in hot toluene and washed with water, then M EDTA solution until washings were nearly colorless, then precipitated twice into 800 mL MeOH and filtered. The product was dried under a stream of $N_2$ overnight at 70° C. to give tan polymer (14 g, 88% yield). $^1$H NMR (500 MHz, 110° C., d1=70s, TCE-$d_2$) δ 4.09 (t br, J=5.3, 2H, a), 2.55 (t br, J=7.4 Hz, 4H, c), 2.40-2.20 (br, 13H, f), 2.00-1.57 (br overlapping, 35H, d+g/g'), 1.51 (s br, 165H, e), 1.47-1.11 (br, 1193H, polyolefin+other aliphatic), 0.96 (t, J=6.7 Hz, 13H, $PE_{Me}$).

NMR indicated that the acrylate resonance was attached to a large molecule, with no evidence of small molecule acrylate. The diffusion coefficient decreased for PE compared to the parent polymer, consistent with an approximately 10 kDa molecular weight (polyolefin equivalent) polymer. The acrylate has a slightly bigger diffusion coefficient than PE, consistent with functionalization that is proportional to $M_n$, not $M_w$ (while diffusion signal is proportional to mass).

Compound A4

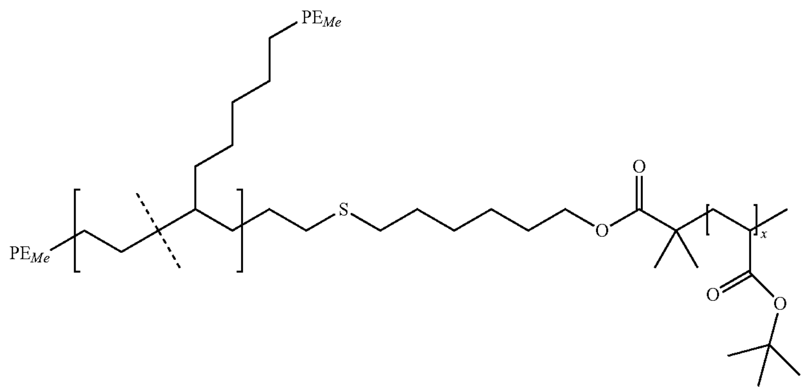

Synthesis of Low MW Polyolefin-b-Poly(AA) [Compound A5]

In a glove box, Compound A4 ($M_n$=10.7 kDa, 13.5 g, 23.2 mmol tert-butyl groups) was dissolved in 50 mL of toluene at 110° C. Trifluoroacetic acid (8.16 mL, 106 mmol, 4.6 equiv.) was added and solution stirred at reflux for 10 minutes. The reaction mixture was then removed from the glovebox, precipitated into 600 mL MeOH, and filtered. The solid/gel was washed with an additional 400 mL of MeOH, and filtered again. The product was then dried under a stream of $N_2$ overnight at 70° C. to yield tan polymer (11.4 g, 90% yield). $^1$H NMR (500 MHz, 110° C., d1=70s, TCE-$d_2$: DMSO-$d_6$ 10:1 v/v) δ 9.75-8.60 (br, 13H, COOH), 1.55-0.40 (br overlapping, 1193H, polyolefin+other aliphatic+$PE_{Me}$).

Compound A5
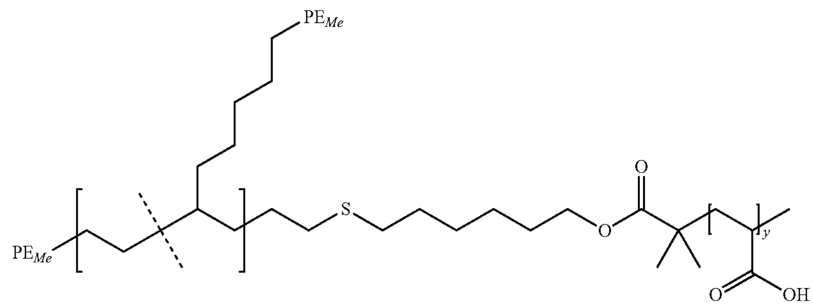
Reaction Sequence B
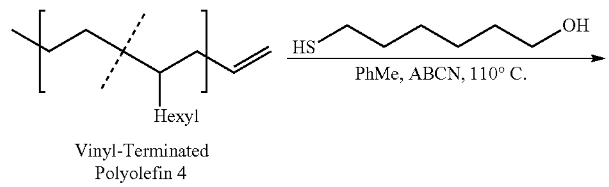
Vinyl-Terminated Polyolefin 4
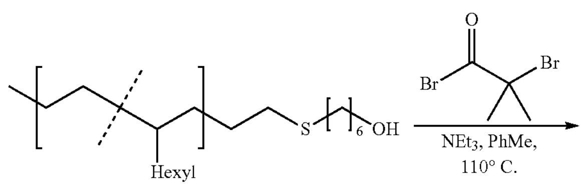
Compound B2
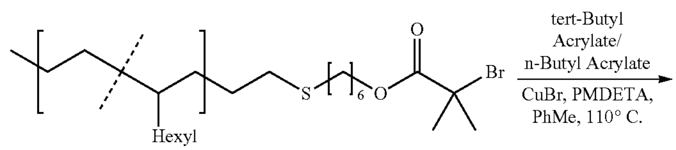
Compound B3
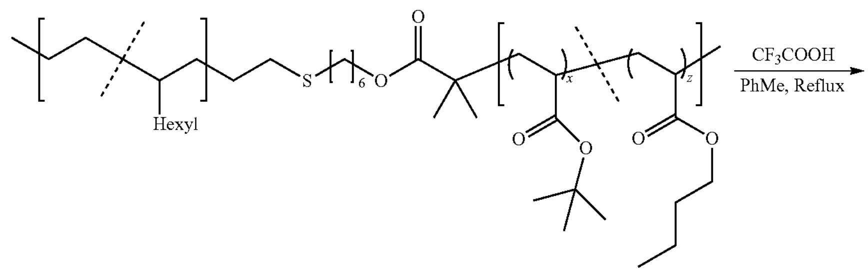
Compound B4
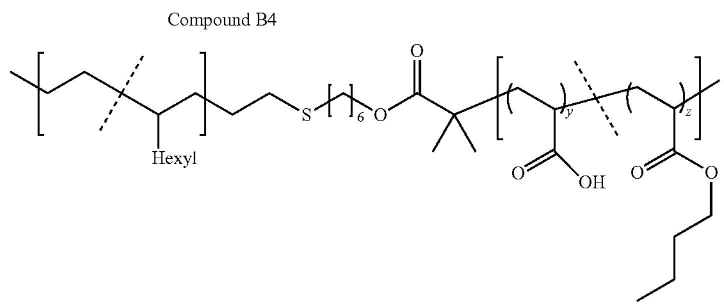
Compound B5

Synthesis of Low MW Hydroxyl-Terminated Polyolefin (Compound B2)

In a glovebox, Vinyl-terminated polyolefin 4 ($M_n$=7.2 kDa, 23.1 g, 3.2 mmol) was dissolved in 60 mL of toluene in a vented glass jar. 6-Mercaptohexanol (2.32 mL, 17.0 mmol, 5.3 equiv.) was added in one portion, followed by ABCN (414 mg, 1.7 mmol, 0.5 equiv.) in 2 mL of toluene. Reaction was stirred for 2 hr. at 110° C., then removed from the glovebox, precipitated into 800 mL of MeOH, filtered, and washed with an additional portion of MeOH. The product was then dried under a stream of $N_2$ overnight at 70° C. to give white polymer in quantitative yield. $^1$H NMR (500 MHz, 110° C., d1=70s, TCE-$d_2$) δ 3.68 (q br, J=6.1 Hz, 2H, a), 2.55 (m br, 4H, c), 1.92-0.74 (br overlapping, 1098H, Polyolefin+other aliphatic+$PE_{Me}$).

Compound B2

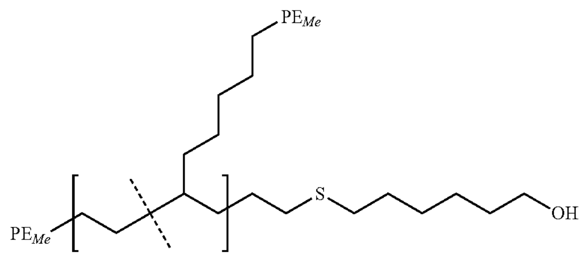

Synthesis of Low MW Macroinitiator (Compound B3)

In a glove box, Compound B2 ($M_n$=7.7 kDa, 23.0 g, 3.0 mmol —OH) was dissolved in 90 mL of toluene in a jar at reflux. Triethylamine (2.06 mL, 14.9 mmol, 5 equiv.) was added, followed by the dropwise addition of 2-bromo-2-methylpropionyl bromide (1.47 mL, 11.9 mmol, 4 equiv.) diluted with 5 mL of toluene. The reaction was allowed to reflux for 75 minutes, then removed from the glovebox, precipitated into 800 mL of MeOH, filtered, then triturated with an additional 600 mL of MeOH and filtered again. The product was dried under a stream of $N_2$ overnight at 70° C. to give tan polymer in quantitative yield. $^1$H NMR (500 MHz, 110° C., d1=TCE-$d_2$) δ 4.25 (t br, 2H, a), 2.58 (m, 4H, c), 2.01 (s, 6H, d), 1.78 (m, 2H, b), 1.67 (m, 5H, e), 1.92-0.74 (br overlapping, 1146H, Polyolefin+other aliphatic+$PE_{Me}$).

Compound B3

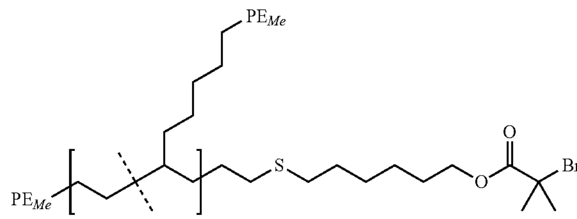

Synthesis of Low MW Polyolefin-b-Poly(tBA)-r-Poly(nBA) (Compound B4)

In a glove box, Compound B3 ($M_n$=8.0 kDa, 10.0 g, 1.21 mmol —Br) was dissolved in 28 mL of toluene at 110° C. Tert-butyl acrylate (4.42 mL, 30.2 mmol, 25 equiv.) and n-butyl acrylate (4.32 mL, 30.2 mmol, 25 equiv.) were added was added and solution stirred until homogeneous. CuBr (173 mg, 1.21 mmol, 1 equiv.) and PMDETA (209 mg, 1.21 mmol, 1 equiv.) were added as a stock solution in benzonitrile (1.04 mL) and the reaction allowed to proceed for 1 hr. The reaction was terminated by removing from glovebox and exposing to air. The solution was diluted to 200 mL in hot toluene, washed with water, then washed with 0.5 M EDTA solution until washings were nearly colorless, then precipitated twice into 800 mL MeOH and filtered. The product was dried under a stream of $N_2$ overnight at 70° C. to give tan polymer (12.6 g, 82% yield). $^1$H NMR (500 MHz, 110° C., d1=70s, TCE-$d_2$) δ 4.10 (br, 32H, a+h), 2.50-2.40 (br, 17H, i+c), 2.40-2.20 (br, 17H, f), 2.00-1.57 (br overlapping, 88H, d+g/g'±j/j'+k), 1.54-1.43 (br, 194H, e+l), 1.47-1.11 (br, 1118H, Polyolefin+other aliphatic), 1.04-0.92 (t, J=6.7 Hz, 59H, $PE_{Me}$+$nBu_{Me}$).

NMR indicated that the acrylate monomers attached to a large molecule, with no evidence of small molecule acrylate.

Comound B4

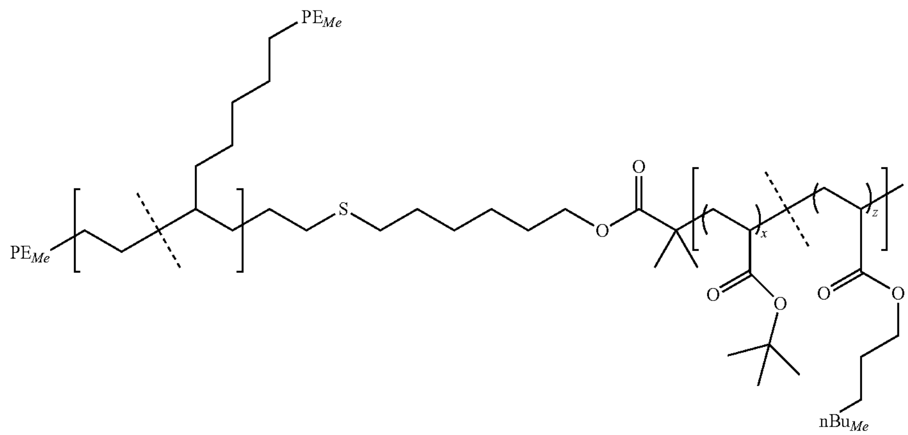

Synthesis of Low MW Polyolefin-b-Poly(AA)-r-Poly(nBA) (Compound B5)

In a glove box, Compound B4 ($M_n$=12.0 kDa (17 wt % tBA), 12.0 g, 16 mmol tert-butyl groups) was dissolved in 50 mL of toluene at 110° C. Trifluoroacetic acid (5.58 mL, 73.0 mmol, 4.6 equiv.) was added and the solution stirred at reflux for 10 minutes, then precipitated into 600 mL MeOH and filtered. The solid/gel was washed with an additional 400 mL of MeOH, and filtered again. The product was then dried under a stream of $N_2$ overnight at 70° C. to yield tan polymer (10.3 g, 90% yield). $^1H$ NMR (500 MHz, 110° C., d1=70s, TCE-$d_2$:DMSO-$d_6$ 10:1 v/v) δ 7.74-6.63 (br, 14H, COOH), 4.02 (br, 29H, h), 2.60-2.18 (DMSO), 2.02-1.33 (br overlapping, 81H), 1.33-0.99 (br overlapping, 1118H), 0.99-0.78 (br, 54H, $PE_{Me}$+$nBu_{Me}$).

Compound B5

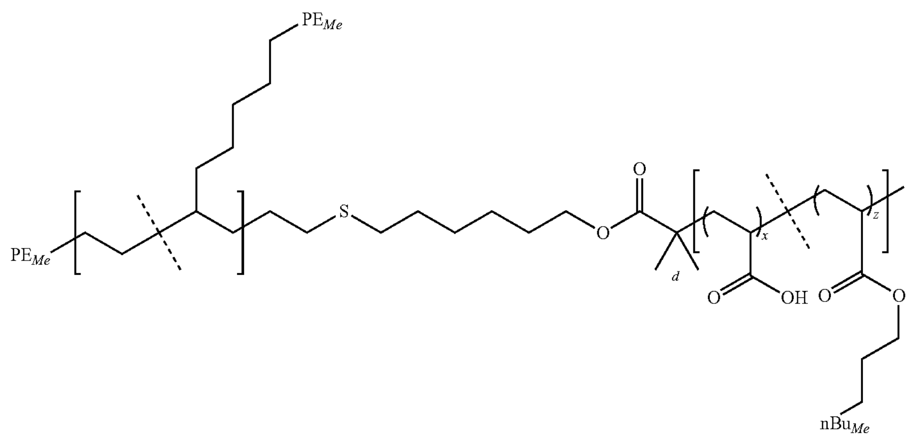

Reaction Sequence C

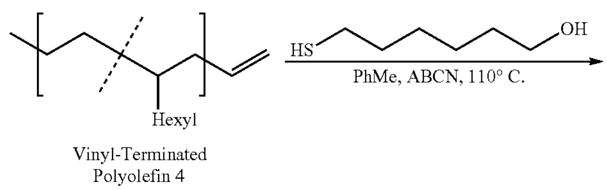

Vinyl-Terminated Polyolefin 4

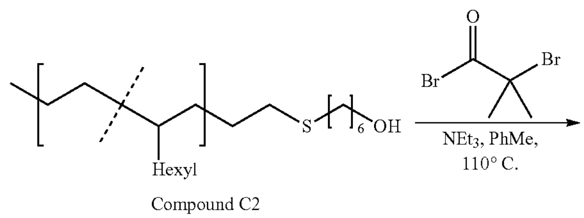

Compound C2

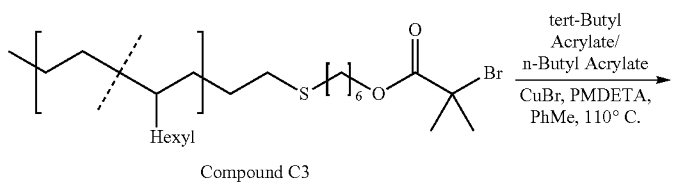

Compound C3

-continued

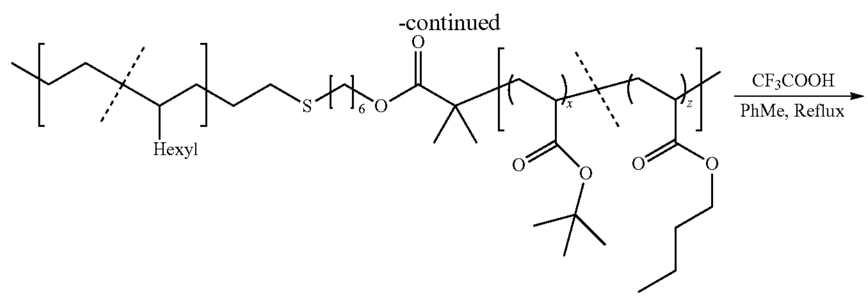

Compound C4

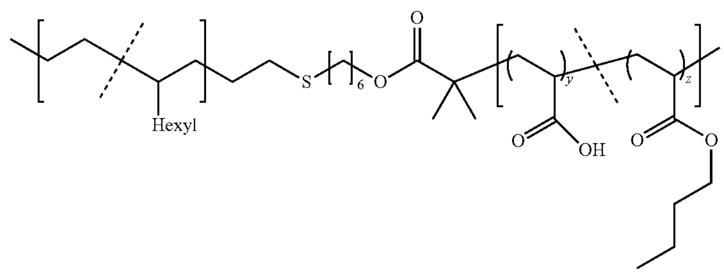

Compound C5

Synthesis of Low MW Polyolefin-b-Poly(tBA)-r-Poly(nBA) (Compound $C_4$)

In a glove box, Compound $C_3$, which was produced using the same sequence to synthesize Compound B2 ($M_n$=8.0 kDa, 10.0 g, 1.21 mmol —Br) was dissolved in 28 mL of toluene at 110° C. Tert-butyl acrylate (4.42 mL, 30.2 mmol, 25 equiv.) and n-butyl acrylate (10.1 mL, 70.5 mmol, 58 equiv.) were added was added and solution stirred until homogeneous. CuBr (173 mg, 1.21 mmol, 1 equiv.) and PMDETA (209 mg, 1.21 mmol, 1 equiv.) were added as a stock solution in benzonitrile (1.04 mL) and the reaction allowed to proceed for 1 hr. The reaction was terminated by removing from glovebox and exposing to air. The solution was diluted to 200 mL in hot toluene, washed with water, then 0.5 M EDTA solution until washings were nearly colorless, then precipitated twice into 800 mL MeOH and filtered. The product was dried under a stream of $N_2$ overnight at 70° C. to give tan polymer (17.0 g, 89% yield). $^1H$ NMR (500 MHz, 110° C., d1=70s, TCE-$d_2$) δ 4.10 (br, 79H), 2.50-2.40 (br, 39H), 2.40-2.20 (br, 20H), 2.00-1.57 (br overlapping, 175H), 1.54-1.43 (br, 271H), 1.47-1.11 (br overlapping, 1118H, Polyolefin+other aliphatic), 1.04-0.92 (t, J=6.7 Hz, 128H, $PE_{Me}$+$nBu_{Me}$).

NMR indicated that the acrylate resonance was attached to a large molecule, with no evidence of small molecule acrylate.

Compund C4

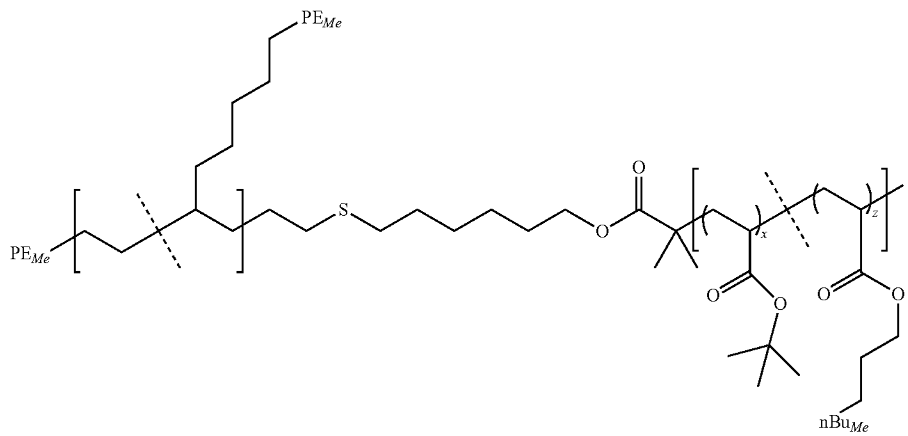

Synthesis of Low MW Polyolefin-b-Poly(AA)-r-Poly(nBA) (Compound $C_5$)

In a glove box, Compound $C_4$ ($M_n$=15.5 kDa (16 wt % tBA), 13.0 g, 16 mmol tert-butyl groups) was dissolved in 60 mL of toluene at 110° C. Trifluoroacetic acid (5.0 mL, 73.0 mmol, 4.0 equiv.) was added and the solution stirred at reflux for 10 minutes, then precipitated into 600 mL MeOH and filtered. The solid/gel was washed with an additional 400 mL of MeOH, and filtered again. The product was then dried under a stream of $N_2$ overnight at 70° C. to yield tan polymer (11.0 g, 88% yield). $^1$H NMR (500 MHz, 110° C., d1=70s, TCE-$d_2$:DMSO-$d_6$ 10:1 v/v) δ 9.50-8.20 (br, 11H, COOH), 4.02 (br, 77H), 2.45-2.18 (br, 62H), 2.02-1.33 (br overlapping, 379H), 1.33-0.99 (br overlapping, 1118H), 0.99-0.78 (br, 116H).

-continued

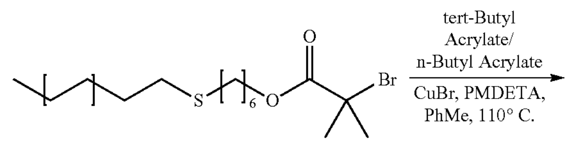

Compound D3

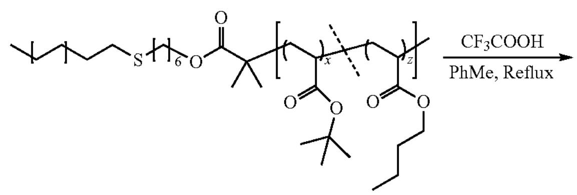

Compound D4

Compound C5

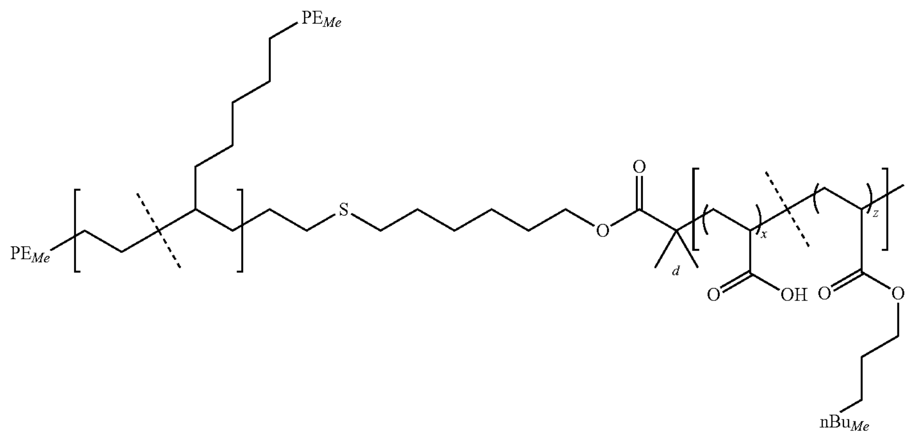

Reaction Sequence D

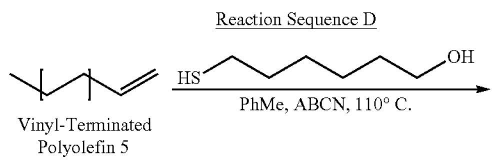

Vinyl-Terminated Polyolefin 5

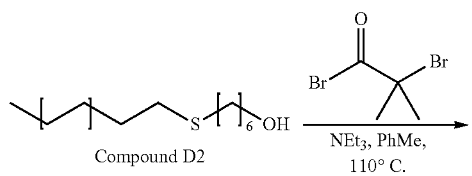

Compound D2

-continued

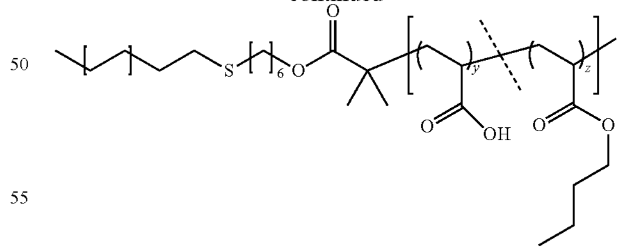

Compound D5

Synthesis of Very Low MW Hydroxyl-Terminated Polyolefin (Compound D2)

In a glovebox, Vinyl-terminated polyolefin 5 ($M_n$=1.5 kDa, 25.3 g, 16.6 mmol) was dissolved in 80 mL of toluene in a vented glass jar at 110° C. 6-Mercaptohexanol (6.80 mL, 47.8 mmol, 3 equiv.) was added in one portion, followed by ABCN (2.02 g, 8.3 mmol, 0.5 equiv.) in 10 mL of toluene. Reaction was stirred for 2 hr. at 110° C., then removed from the glovebox, precipitated into 800 mL of MeOH, filtered, and washed with an additional portion of MeOH. The product was then dried under a stream of $N_2$ overnight at 70° C. to give white polymer (26.5 g, 96% yield). $^1$H NMR (500 MHz, 110° C., d1=70s, TCE-$d_2$) δ 3.68 (q br, 2H, a), 2.55 (m br, 4H, c), 1.92-0.74 (br overlapping, 205H, Polyolefin+ other aliphatic+$PE_{Me}$).

Compound D2

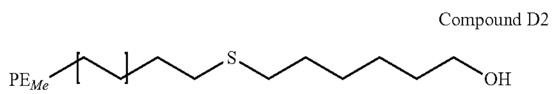

Synthesis of Very Low MW Macroinitiator (Compound D3)

In a glove box, Compound D2 ($M_n$=1.5 kDa, 26.0 g, 17.6 mmol —OH) was dissolved in 120 mL of toluene in a jar at reflux. Triethylamine (7.30 mL, 52.7 mmol, 3 equiv.) was added, followed by the dropwise addition of 2-bromo-2-methylpropionyl bromide (4.35 mL, 35.1 mmol, 2 equiv.) diluted with 10 mL of toluene. The reaction was allowed to reflux for 30 minutes, then removed from the glovebox and precipitated into 800 mL of MeOH, filtered, then triturated with an additional 600 mL of MeOH and filtered again. The product was dried under a stream of $N_2$ overnight at 70° C. to give tan polymer (27.8 g, 97% yield). $^1$H NMR (500 MHz, 110° C., d1=TCE-$d_2$) δ 4.25 (t br, 2H) 2.58 (m, 4H), 2.01 (s, 6H), 1.92-0.74 (br overlapping, 208H).

Compound D3

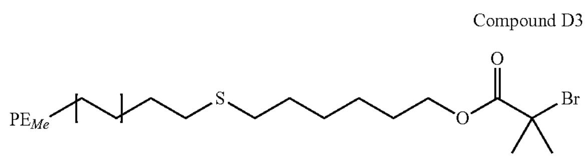

Synthesis of Very Low MW Polyolefin-b-Poly(tBA)-r-Poly(nBA) (Compound D4)

In a glove box: Compound D3 ($M_n$=1.7 kDa, 26.0 g, 15.6 mmol —Br) was dissolved in 180 mL of toluene at 110° C. in a 500 mL round bottom flask with stir bar. Tert-butyl acrylate (11.4 mL, 77.8 mmol, 5 equiv.) and n-butyl acrylate (33.4 mL, 234 mmol, 15 equiv.) were added was added and solution stirred until homogeneous. CuBr (2.23 g, 15.6 mmol, 1 equiv.) and PMDETA (2.70 g, 15.6 mmol, 1 equiv.) were added as a stock solution in benzonitrile (13.4 mL) and the reaction allowed to proceed for 30 min. The reaction was terminated by removing from the glovebox and exposing to air, then precipitated twice into 800 mL MeOH and filtered. The product was dried under a stream of $N_2$ overnight at 70° C. to give tan polymer (18.6 g, 35% yield)[*while conversion was good, the majority of product was lost due to spillage]. $^1$H NMR (500 MHz, 110° C., d1=70s, TCE-$d_2$) δ 4.10 (br, 25H, a+h), 2.50-2.40 (br, 13H, i+c), 2.40-2.20 (br, 6H, f), 2.00-1.57 (br overlapping, 53H), 1.54-1.43 (br, 63H, e+l), 1.47-1.11 (br, 208H, Polyolefin+other aliphatic), 1.04-0.92 (t, J=6.7 Hz, 38H).

Compound D4

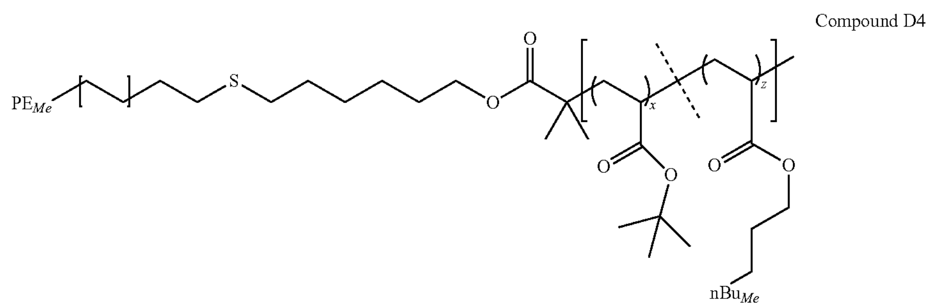

Synthesis of Very Low MW Polyolefin-b-Poly(AA)-r-Poly(nBA) (Compound D5)

Compound D4 ($M_n$=3.6 kDa (15 wt % tBA), 18.1 g, 16 mmol tert-butyl groups) was added to a 500 mL round bottom flask containing 200 mL of toluene, fitted with a reflux condenser, and stirred with an overhead stirrer with heating mantle set at 115° C. The mantle temperature was reduced to 105° C. and trifluoroacetic acid (16.1 mL, 211 mmol, 10 equiv.) was added and solution stirred for 1 hr. The heating mantle was then removed, reaction was cooled to room temperature, then precipitated in portions, into four 500 mL jars, each containing 300 mL MeOH. The combined portions were isolate by filtration and the resulting solid washed with methanol, filtered, and dried in a vacuum oven at 50° C. for 18 h to yield a light brown powder (13.77 g, 81% yield). An additional portion was obtained by allowing solid to settle from the supernatant and isolating in the same manner (0.90 g, 5.3% yield). Combined yield is 14.67 g (87%). $^1$H NMR (500 MHz, 110° C., d1=70s, TCE-$d_2$: DMSO-$d_6$ 10:1 v/v) δ 11.2-9.5 (br, 2H, COOH), 4.02 (br, 23H), 2.60-2.18 (br, 19H), 2.02-1.33 (br overlapping, 87H), 1.33-0.99 (br overlapping, 208H), 0.99-0.78 (br, 36H).

Compound D5

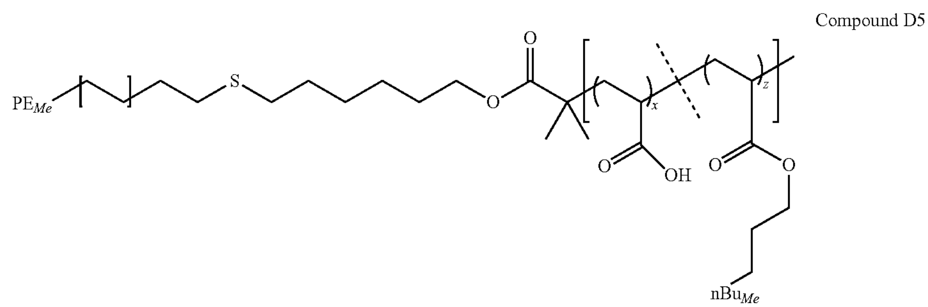

Reaction Sequence E

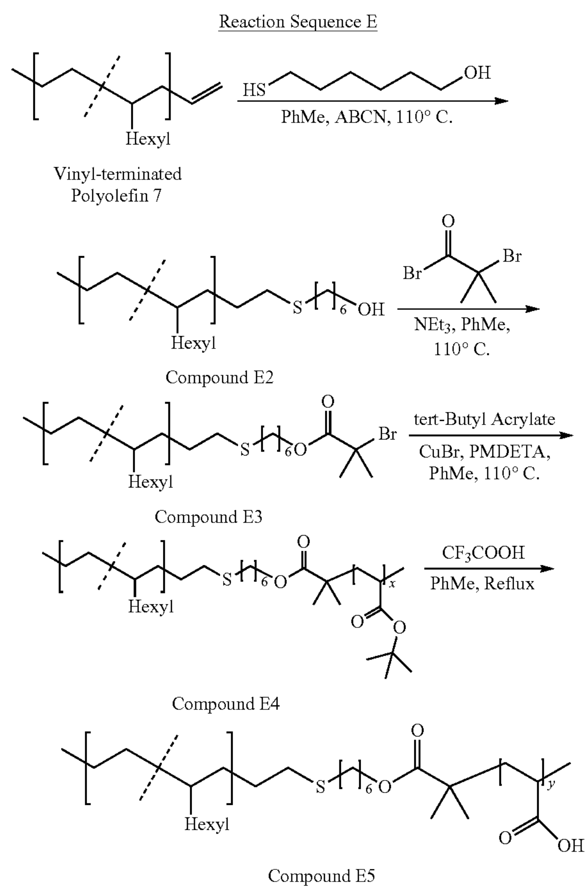

Vinyl-terminated Polyolefin 7

Compound E2

Compound E3

Compound E4

Compound E5

Synthesis of High MW Hydroxyl-Terminated Polyolefin (Compound E2)

In a glovebox, Vinyl-terminated polyolefin 7 ($M_n$=26.6 kDa, 23.1 g, 0.87 mmol) was dissolved in 125 mL of toluene in a vented round bottom flask at reflux. 6-Mercaptohexanol (1.20 mL, 9.0 mmol, 10 equiv.) was added in one portion, followed by ABCN (218 mg, 0.89 mmol, 1 equiv.) in 5 mL of toluene. Reaction was stirred for 2 hr, at which time an additional portion of 6-Mercaptohexanol (1.20 mL, 9.0 mmol, 10 equiv.) and ABCN (218 mg, 0.89 mmol, 1 equiv.) were added. After an additional 2 hr, the reaction was removed from the glovebox, precipitated into 800 mL of MeOH, filtered, and washed with an additional portion of MeOH. The product was then dried under a stream of $N_2$ overnight at 70° C. to give white polymer (22.6 g, 97% yield). 1H NMR (500 MHz, 110° C., d1=70s, TCE-$d_2$) δ 3.68 (m br, 2H), 2.55 (m br, 4H), 1.92-0.74 (br overlapping, 4433H).

Compound E2

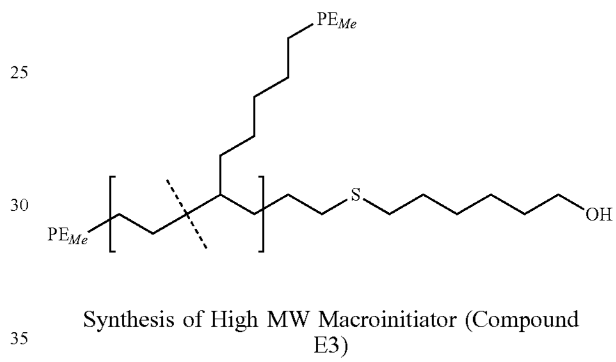

Synthesis of High MW Macroinitiator (Compound E3)

In a glove box, Compound E2 ($M_n$=31.0 kDa, 22.5 g, 0.73 mmol —OH) was dissolved in 135 mL of toluene in a round bottom at reflux. Triethylamine (1.56 mL, 11.3 mmol, 15.6 equiv.) was added, followed by the dropwise addition of 2-bromo-2-methylpropionyl bromide (0.84 mL, mmol, 9.4 equiv.) diluted with 10 mL of toluene. The reaction was allowed to reflux for 30 minutes, then removed from the glovebox, precipitated into 800 mL of MeOH, filtered, then triturated with an additional 600 mL of MeOH and filtered again. The product was dried under a stream of $N_2$ overnight at 70° C. to give tan in quantitative yield. $^1H$ NMR (500 MHz, 110° C., d1=70s, TCE-$d_2$) δ 4.25 (t br, 2H), 2.58 (m, 4H), 2.01 (s, 6H), 1.78-1.74 (br overlapping, 4265H).

Compound E3

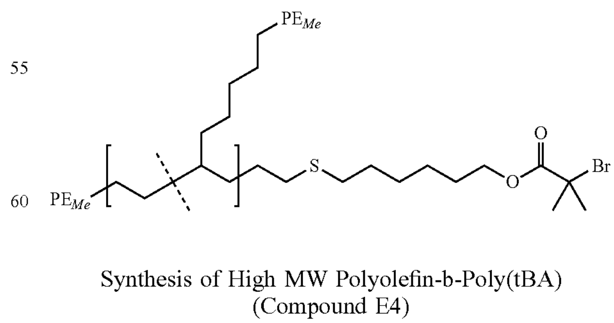

Synthesis of High MW Polyolefin-b-Poly(tBA) (Compound E4)

In a glove box, Compound E3 ($M_n$=30.0 kDa, 10.0 g, 0.33 mmol —Br) was dissolved in 50 mL of toluene at 110° C.

Tert-butyl acrylate (10.6 mL, 72.7 mmol, 218 equiv.) was added and solution stirred until homogeneous. CuBr (48 mg, 0.33 mmol, 1 equiv.) and PMDETA (0.069 mL, 0.33 mmol, 1 equiv.) were added as a stock solution in benzonitrile (0.29 mL) and the reaction allowed to proceed for 5 hr. The reaction was terminated by removing from glovebox and exposing to air. The solution was then precipitated twice into 800 mL MeOH, filtered, and washed with two additional portions of 500 mL MeOH until the polymer was colorless. The product was dried under a stream of $N_2$ overnight at 70° C. to give white polymer in quantitative yield. $^1$H NMR (500 MHz, 110° C., d1=70s, TCE-$d_2$) δ 4.09 (t br, J=5.3, 2H), 2.55 (t br, J=7.4, 5H), 2.40-2.20 (br, 48H), 2.00-1.57 (br overlapping, 93H), 1.51 (s br, 486H), 1.47-1.11 (br, 4234H), 0.96 (t, J=6.7, 39H).

Compound E4

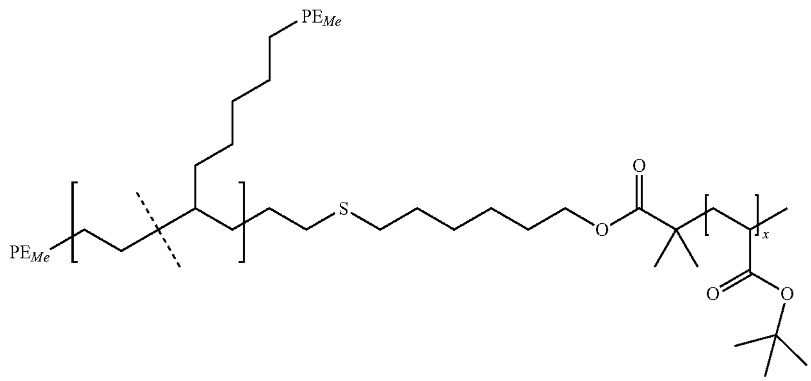

Synthesis of Low MW Polyolefin-b-Poly(AA) (Compound E5)

Compound E4 ($M_n$=36.9 kDa, 10.8 g, 19 wt % tBA, 16.0 mmol tert-butyl groups) was added to a 500 mL round bottom flask equipped with a reflux condenser and a mechanical stirrer, and toluene (200 mL) was added. The mixture was stirred at reflux (heating mantle set to 115° C.) until a clear, viscous solution was obtained (approximately 20 min). The heating mantle temperature was reduced to 105° C., and trifluoroacetic acid (12.3 mL, 160 mmol, 10 equiv.) was rapidly added to the mixture. The reaction was allowed to stir at 105° C. for 1 h. The heating mantle was removed and the reaction was allowed to cool to room temperature. The resulting gel/paste was precipitated into a jar containing rapidly stirring methanol (3 jars each with 350 mL), resulting in the formation of a milky white suspension. The suspension were combined, filtered, washed with methanol, and dried in a vacuum oven at 50° C. for 18 h to yield a white powder (9.61 g, 97% yield). $^1$H NMR (500 MHz, 110° C., d1=70s, TCE-$d_2$:DMSO-$d_6$ 10:1 v/v) δ 11.50-10.50 (br, 43H, COOH), 1.28-0.99 (br, 4234H, polyolefin), 0.89-0.84 (br, 52H, $PE_{Me}$)

Compound E5

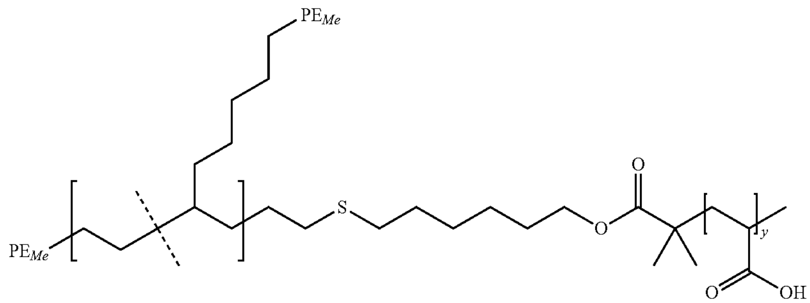

Reaction Sequence F

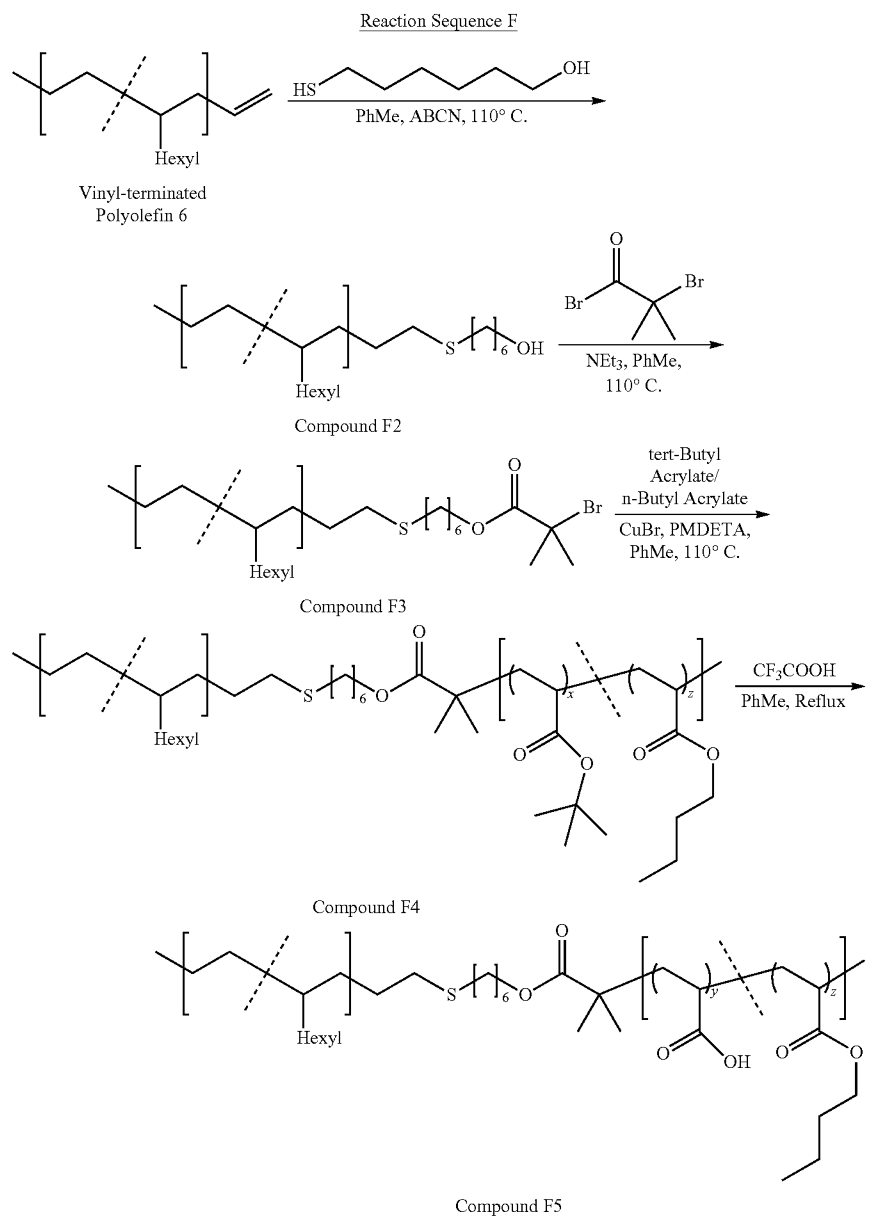

Vinyl-terminated Polyolefin 6

Compound F2

Compound F3

Compound F4

Compound F5

Synthesis of High MW Hydroxyl-Terminated Polyolefin (Compound F2)

In a glovebox: Vinyl-terminated polyolefin 6 ($M_n$=25.8 kDa, 25.5 g, 0.99 mmol) was dissolved in 227 mL of toluene at reflux in a vented 500 mL round bottom flask with stir bar. 6-Mercaptohexanol (1.11 mL, 8.13 mmol, 8.2 equiv.) was added in one portion, followed by ABCN (132 mg, 0.54 mmol, 0.54 equiv.) in 5 mL of toluene. Reaction was stirred for 2 hr. at reflux, then additional portions of 6-Mercaptohexanol (1.11 mL, 8.13 mmol, 8.2 equiv.) and ABCN in 5 mL toluene (132 mg, 0.54 mmol, 0.54 equiv.) were added and the reaction continued for another 2 hr. The reaction was then removed from the glovebox, cooled, precipitated into 750 mL of MeOH, filtered, and washed with an additional portion of MeOH. The product was then dried under a stream of $N_2$ overnight at 70° C. to give white polymer (24.7 g, 96% yield). $^1$H NMR (500 MHz, 110° C., d1=70s, TCE-$d_2$) δ 3.68 (br, 2H, a), 2.55 (m br, 4H, c), 1.92-0.74 (br, 4264H, Polyolefin, overlapping methylenes, $PE_{Me}$).

Compound F2

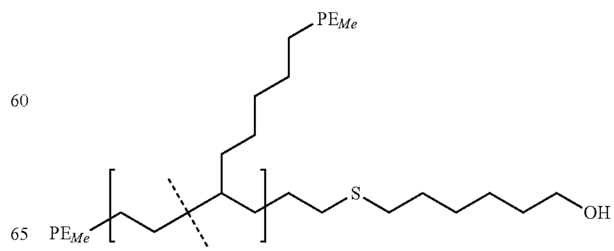

Synthesis of High MW Macroinitiator (Compound F3)

In a glove box, Compound F2 ($M_n$=29.8 kDa, 24.7 g, 0.83 mmol —OH) was dissolved in 145 mL of toluene in a 500 mL round bottom flask at reflux. Triethylamine (1.71 mL, 12.4 mmol, 15 equiv.) was added dropwise, followed by the dropwise addition of 2-bromo-2-methylpropionyl bromide (0.92 mL, 7.4 mmol, 9 equiv.) diluted with 5 mL of toluene. The reaction was allowed to reflux for 75 minutes, then removed from the glovebox and precipitated into 800 mL of MeOH, filtered, then triturated with an additional 600 mL of MeOH and filtered again. The product was dried under a stream of $N_2$ overnight at 70° C. to give tan polymer (24.7 g, 99% yield). $^1$H NMR (500 MHz, 110° C., d1=70s, TCE-$d_2$) δ 4.25 (t br, 2H), 2.58 (br, 4H), 2.01 (s, 6H), 1.78-1.74 (br overlapping, 4638H).

Compound F3

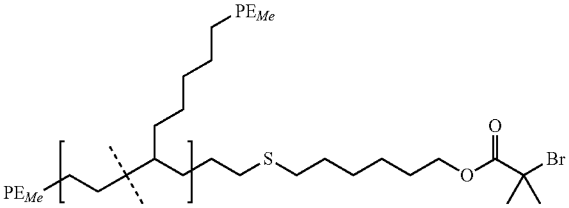

Synthesis of High MW Polyolefin-b-Poly(tBA)-r-Poly(nBA) (Compound F4)

In a glove box, Compound F3 ($M_n$=32.3 kDa, 10.0 g, 0.31 mmol —Br) was dissolved in 50 mL of toluene at 110° C. in a 250 mL glass jar with stir bar. Tert-butyl acrylate (10.8 mL, 74 mmol, 250 equiv.) and n-butyl acrylate (10.6 mL, 74 mmol, 250 equiv.) were added was added and solution stirred until homogeneous. CuBr (42 mg, 0.3 mmol, 1 equiv.) and PMDETA (51 mg, mmol, 1 equiv.) were added as a stock solution in benzonitrile (0.255 mL) and the reaction allowed to proceed for 5 hr. The reaction was terminated by removing from glovebox and exposing to air. The slurry was then precipitated into 800 mL MeOH and filtered, rinsing with excess MeOH. The product was dried under a stream of $N_2$ overnight at 70° C. to give white polymer (15.5 g, 98% yield). $^1$H NMR (500 MHz, 110° C., d1=70s, TCE-$d_2$) δ 4.10 (br, 149H), 2.50-2.40 (br, 75H), 2.40-2.20 (br, 80H), 2.00-1.57 (br overlapping, 434H), 1.54-1.43 (br, 934H), 1.47-1.11 (br, 4621H), 1.04-0.92 (t, J=6.7, 268H).

Compound F4

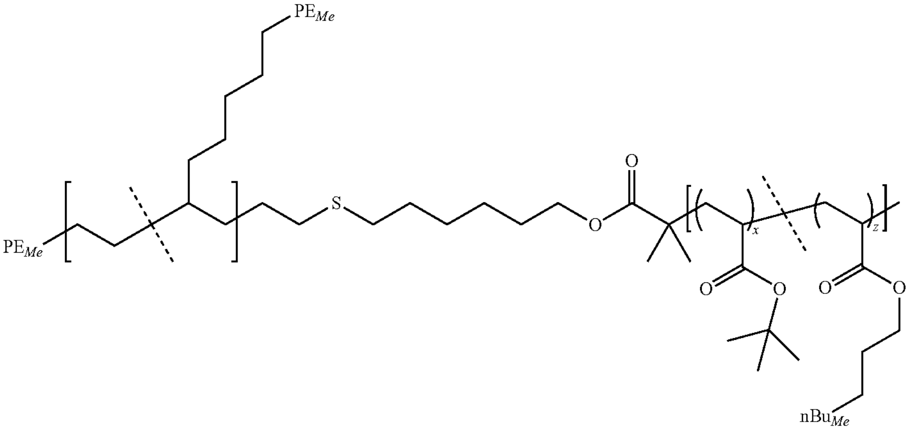

Synthesis of High MW Polyolefin-b-Poly(AA)-r-Poly(nBA) (Compound F5)

Compound F4 ($M_n$=51.2 kDa, 14.0 g, 18 wt % tBA, 19.7 mmol tert-butyl groups) was added to a 500 mL round bottom flask equipped with a reflux condenser and a mechanical stirrer, and toluene (200 mL) was added. The mixture was stirred at reflux (heating mantle set to 115° C.) until a clear, viscous solution was obtained (approximately 20 min). The heating mantle temperature was reduced to 105° C., and trifluoroacetic acid (15.0 mL, 196 mmol, 10 equiv.) was rapidly added to the mixture. The reaction was allowed to stir at 105° C. for 1 h. The heating mantle was removed and the reaction was allowed to cool to room temperature. The resulting suspension was precipitated into a jar containing rapidly stirring methanol (3 jars each with 350 mL), resulting in the formation of a milky white suspension. The suspension were combined, filtered, washed with methanol, and dried in a vacuum oven at 50° C. for 18 h to yield a white powder (12.2 g, 95% yield). $^1$H NMR (500 MHz, 110° C., d1=70s, TCE-$d_2$:DMSO-$d_6$ 10:1 v/v) δ 11.37-9 (br, 47H, COOH), 4.02 (br, 144H, h), 2.45-2.18 (br, 133H), 2.02-1.33 (br overlapping, 678H), 1.33-0.99 (br, 4621H), 0.99-0.78 (br, 259H).

Compound F5
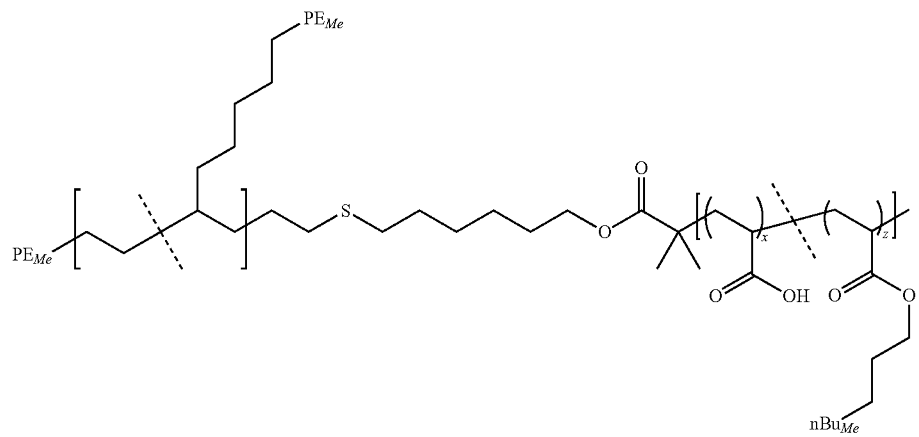
20
Reaction Sequence G
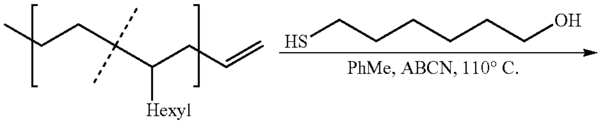
Vinyl-terminated
Polyolefin 6
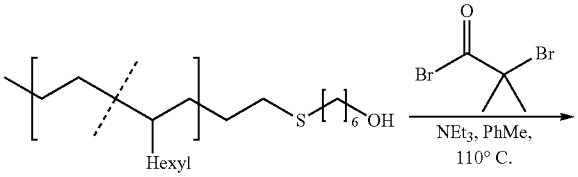
Compound G2
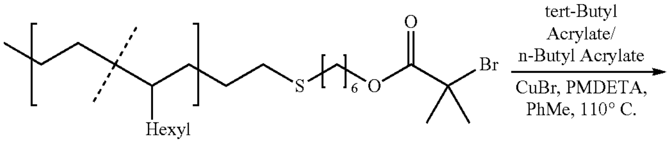
Compound G3
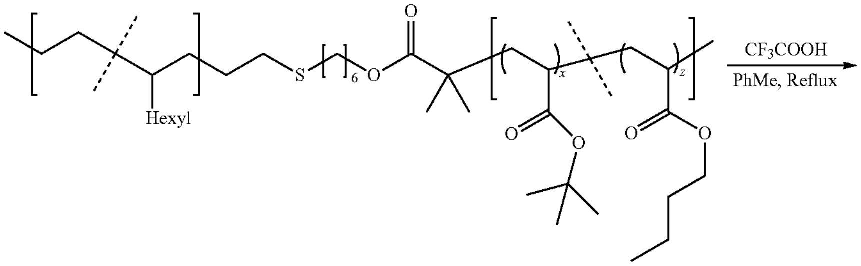
Compound G4

-continued

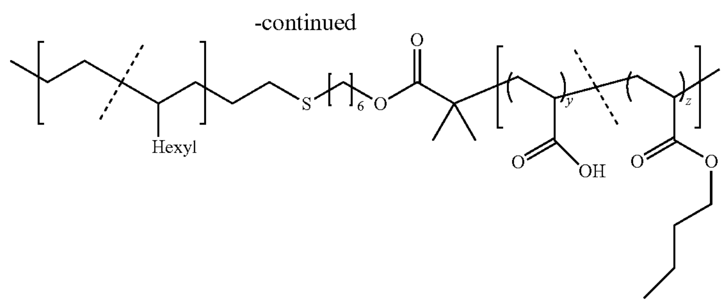

Compound G5

Synthesis of High MW Polyolefin-b-Poly(tBA)-r-Poly(nBA) (Compound G4)

In a glove box, Compound G3, which was produced using the same sequence to synthesize Compound F2, ($M_n$=32.3 kDa, 10.0 g, 0.31 mmol —Br), was dissolved in 50 mL of toluene at 110° C. in a 250 mL glass jar with a stir bar. Tert-butyl acrylate (10.8 mL, 74 mmol, 250 equiv.) and n-butyl acrylate (24.7 mL, 173 mmol, 583 equiv.) were added was added and solution stirred until homogeneous. CuBr (42 mg, 0.3 mmol, 1 equiv.) and PMDETA (51 mg, 0.3 mmol, 1 equiv.) were added as a stock solution in benzonitrile (0.255 mL) and the reaction allowed to proceed for 5 hr. The reaction was terminated by removing from glovebox and exposing to air. The slurry was then precipitated into 800 mL MeOH, filtered, and washed with excess MeOH. The product was dried under a stream of $N_2$ overnight at 70° C. to give white polymer (17.2 g, 97% yield). $^1$H NMR (500 MHz, 110° C., d1=70s, TCE-$d_2$) δ 4.10 (br, 311H), 2.50-2.40 (br, 127H), 2.40-2.20 (br, 85H), 2.00-1.57 (br overlapping, 702H), 1.54-1.43 (br, 1075H, e+l), 1.47-1.11 (br, 4621H), 1.04-0.92 (t, J=6.7, 502H)

Compound G4

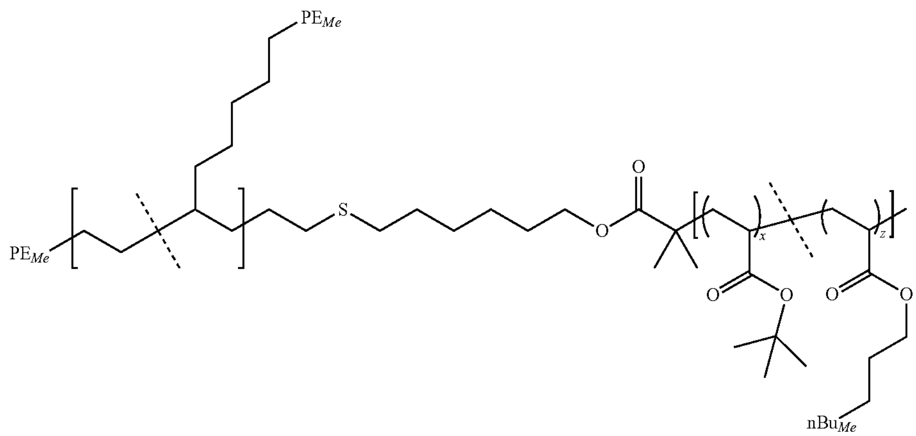

Synthesis of High MW Polyolefin-b-Poly(AA)-r-Poly(nBA) (Compound G5)

Compound G4 ($M_n$=60.8 kDa, 16.7 g, 14 wt % tBA, 18.1 mmol tert-butyl groups) block copolymer was added to a 500 mL round bottom flask equipped with a reflux condenser and a mechanical stirrer, and toluene (200 mL) was added. The mixture was stirred at reflux (heating mantle set to 115° C. for 50 min then 125° C. for 30 min) until a clear, viscous solution was obtained. The heating mantle temperature was reduced to 105° C., and trifluoroacetic acid (13.9 mL, 181 mmol, 10 equiv.) was rapidly added to the mixture. The reaction was allowed to stir at 105° C. for 1 h. The heating mantle was removed and the reaction was allowed to cool to room temperature. The resulting paste/gel was precipitated into a jar containing rapidly stirring methanol (4 jars each with 350 mL), resulting in the formation of a milky white suspension. The suspension were combined, filtered, washed with methanol, and dried in a vacuum oven at 50° C. for 18 h to yield a white powder (14.8 g, 95% yield). $^1$H NMR (500 MHz, 110° C., d1=70s, TCE-$d_2$:DMSO-$d_6$ 10:1 v/v) δ 11.37-9.20 (br, 38H, COOH), 4.02 (br, 286H, h), 2.45-2.18 (br, 189H, i+f), 2.02-1.33 (br overlapping, 1062H, g/g'±j/j'+k+1), 1.33-0.99 (br, 4621H, polyolefin), 0.99-0.78 (br, 471H, $PE_{Me}$+$nBu_{Me}$)

Compound G5

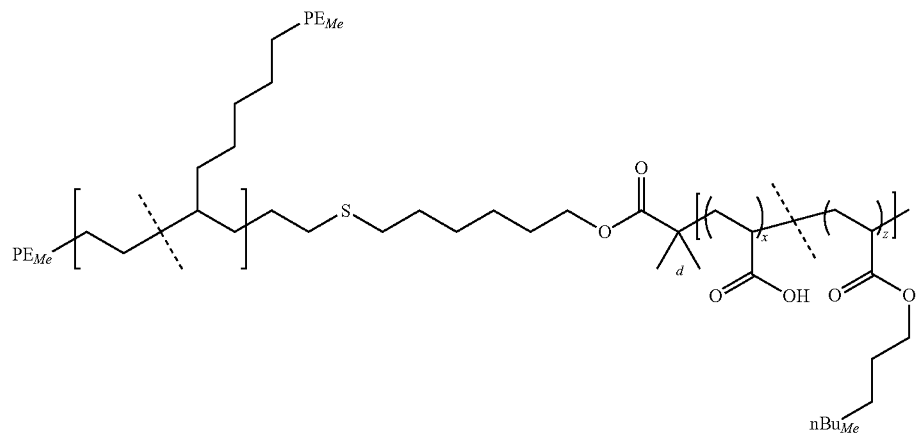

Reaction Sequence H

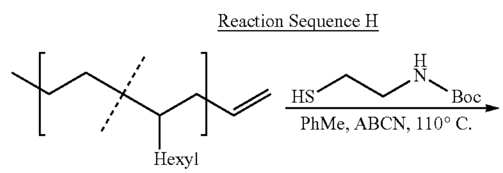

Vinyl-terminated Polyolefin 2

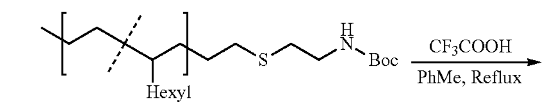

Compound H2-BOC

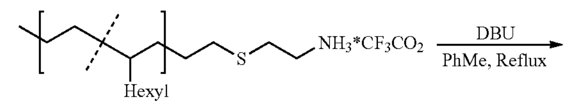

Compound H2-H$^+$

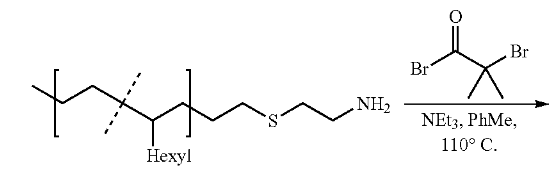

Compound H2

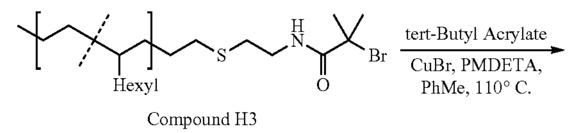

Compound H3

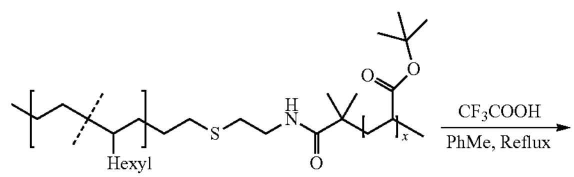

Compound H4

-continued

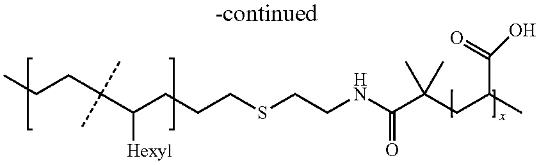

Compound H5

Synthesis of Low MW NH-Boc-Terminated Polyolefin (Compound H2-BOC)

In a glovebox, vinyl-terminated polyolefin 2 ($M_n$=4.2 kDa, 20.4 g, 5.1 mmol) was dissolved in 60 mL of toluene in a vented glass jar. 2-(Boc-amino)ethanethiol (4.06 mL, 24 mmol, 4.7 equiv.) was added in one portion, followed by ABCN (588 mg, 2.40 mmol, 0.47 equiv.) in 2 mL of toluene. Reaction was stirred for 4 hr. at 110° C., then removed from the glovebox, precipitated into 600 mL of MeOH, filtered, and washed with an additional 400 mL portion of MeOH. The product was then dried under a stream of $N_2$ overnight at 70° C. to give white polymer (20.8 g, 98% yield). $^1$H NMR (500 MHz, 110° C., d1=70s, TCE-$d_2$) δ 4.76 (br, 1H, NH), 3.34 (q, J=6.5 Hz, 2H, a), 2.69 (t, J=6.6 Hz, 2H, b), 2.58 (t, J=7.3 Hz, 2H, c), 1.78 (m, 2H, d), 1.65 (s, 9H, e), 1.49-0.89 (br, 691H).

Compound H2-BOC

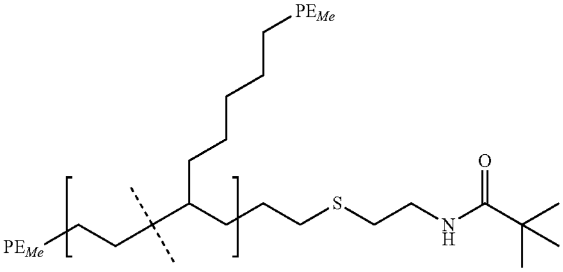

Synthesis of Low MW $NH_3$-TFA-Terminated Polyolefin (Compound H2-H$^+$)

In a glove box, Compound H2-BOC ($M_n$=4.8 kDa, 20.0 g, 4.17 mmol) was dissolved in 40 mL of toluene at 110° C.

Trifluoroacetic acid (3.0 mL, 39 mmol, 9.5 equiv.) was added and solution stirred at reflux for 30 minutes, then precipitated into 500 mL MeOH and filtered. The solid was washed with an additional 300 mL of MeOH and filtered again. The product was then dried under a stream of $N_2$ overnight at 70° C. to yield tan polymer in quantitative yield. $^1H$ NMR (500 MHz, 110° C., d1=70s, TCE-$d_2$) δ 5.00 (br, 3H, $NH_3^+$), 3.23 (br, 2H, a), 2.90 (t, J=7.4 Hz, 2H), 2.60 (t, J=7.4 Hz, 2H), 1.66 (m, 2H, d), 1.56-0.85 (br, 772H).

Compound H2-H*

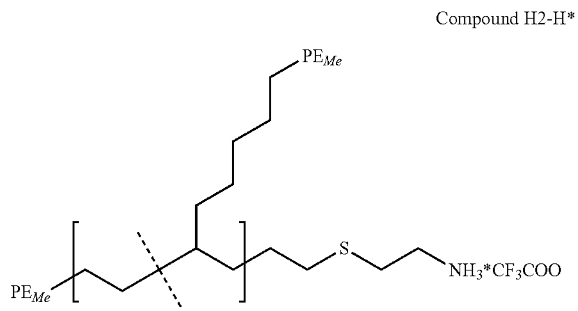

Synthesis of Low MW Amine-Terminated Polyolefin (Compound H3)

In a glove box, Compound H2-H$^+$ ($M_n$=5.1 kDa, 17.0 g, 3.33 mmol) was dissolved in mL of toluene at 110° C. 1,8-Diazabicyclo[5.4.0]undec-7-ene (DBU) (0.94 mL, 6.3 mmol, 1.9 equiv.) was added and solution stirred at reflux for 20 minutes, then precipitated into 800 mL MeOH, filtered, and washed with an additional 500 mL portion of MeOH. The product was then dried under a stream of $N_2$ overnight at 70° C. to yield tan polymer in quantitative yield. $^1H$ NMR (500 MHz, 110° C., d1=70s, TCE-$d_2$) δ 2.99 (br, 2H, a), 2.71 (br, 2H, b), 2.60 (t, J=7.2 Hz, 2H, c), 1.68 (m, 2H, d), 1.61-0.89 (br, 713H, Polyolefin+$PE_{Me}$).

Compound H2

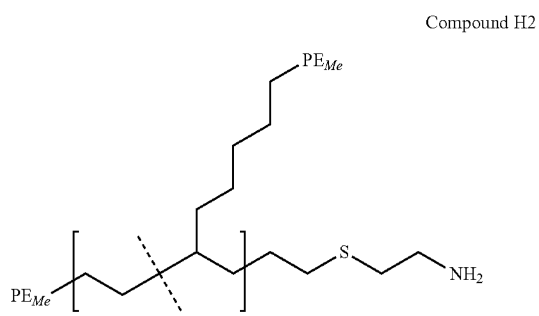

Synthesis of Low MW Amide-Linked Macroinitiator (Compound H3)

In a glove box, Compound H2 ($M_n$=5.0 kDa, 16.0 g, 3.2 mmol —$NH_2$) was dissolved in 48 mL of toluene in a jar at reflux. Triethylamine (2.63 mL, 19.0 mmol, 5.9 equiv.) was added, followed by the dropwise addition of 2-bromo-2-methylpropionyl bromide (1.57 mL, 12.7 mmol, 4 equiv.) diluted with 5 mL of toluene. The reaction was allowed to reflux for 75 minutes, then removed from the glovebox, precipitated into 800 mL of MeOH, filtered, then triturated with an additional 600 mL of MeOH and filtered again. The product was dried under a stream of $N_2$ overnight at 70° C. to give tan polymer in quantitative yield. $^1H$ NMR (500 MHz, 110° C., d1=TCE-$d_2$) δ 6.90 (br, 1H, NH), 3.50 (td, J=6.4, 6.2 Hz, 2H, a), 2.74 (t, J=6.6 Hz, 2H, b), 2.61 (t, J=7.3 Hz, 2H, c), 2.01 (s, 6H, e), 1.66 (m, 2H, d), 1.59-0.84 (br, 750H).

Compound H3

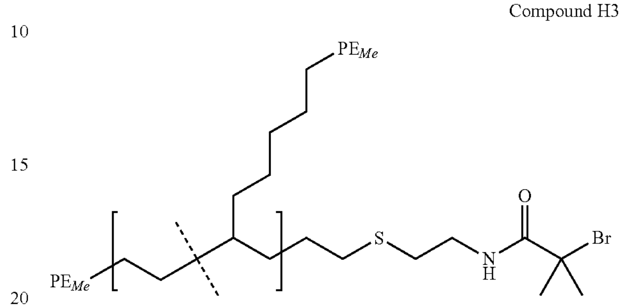

Synthesis of Low MW Amide-Linked Polyolefin-b-Poly(tBA) (Compound H4)

In a glove box, Compound H3 ($M_n$=5.3 kDa, 15.0 g, 2.8 mmol —Br) was dissolved in mL of toluene at 110° C. Tert-butyl acrylate (19.5 mL, 133 mmol, 47 equiv.) was added and solution stirred until homogeneous. CuBr (384 mg, 2.7 mmol, 0.95 equiv.), $CuBr_2$ (32 mg, 0.14 mmol, 0.05 equiv.) and PMDETA (0.590 mL, 2.8 mmol, 1 equiv.) were added as a stock solution in benzonitrile (2.3 mL) and the reaction allowed to proceed for 75 min. The reaction was terminated by removing from glovebox and exposing to air. The solution was diluted to 200 mL in hot toluene and washed with water, then 0.5 M EDTA solution until washings were nearly colorless, then precipitated twice into 800 mL MeOH and filtered. The product was dried under a stream of $N_2$ overnight at 70° C. to give tan polymer (21.4 g, 80% yield). $^1H$ NMR (500 MHz, 110° C., d1=70s, TCE-$d_2$) δ 3.44 (br, 2H, a), 2.69 (br, 2H, b), 2.57 (br, 2H, c), 2.32 (br, 24H, g), 2.00-1.58 (br overlapping 48H, h/h'+e), 1.51 (br s, 260H), 1.51-0.86 (br, 750H).

Compound H4

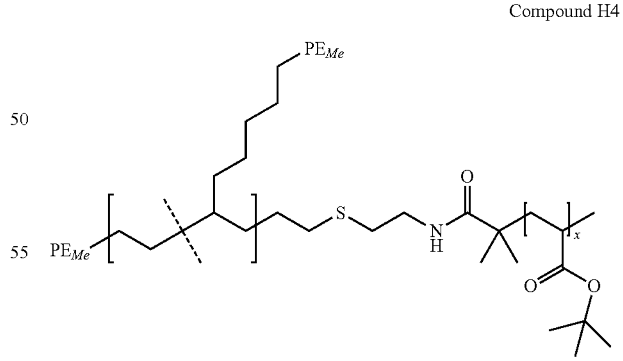

Synthesis of Low MW Amide-Linked Polyolefin-b-Poly(AA)-r-Poly(nBA) (Compound H5)

In a glove box, Compound H4 ($M_n$=5.3 kDa, 41 wt % tBA, 21.0 g, 67 mmol tert-butyl groups) was dissolved in 120 mL of toluene at 110° C. Trifluoroacetic acid (26.0 mL, 336 mmol, 5 equiv.) was added and solution stirred at reflux for 10 minutes, then precipitated into 600 mL MeOH and filtered. The solid/gel was washed with an additional 400 mL of MeOH, and filtered again. The product was then dried under a stream of $N_2$ overnight at 70° C. to yield tan polymer (16.2 g, 94% yield). $^1H$ NMR (500 MHz, 110° C., d1=70s, TCE-$d_2$:DMSO-$d_6$ 10:1 v/v) δ 10.00-8.10 (br, 25H, COOH), 1.46-0.75 (br, 750H).

Compound H5

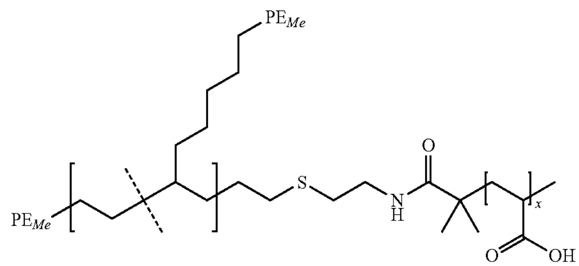

For each of the Reaction Sequence A to H, the amount of polymer with end functionalization (specifically, vinyl terminated polyolefin) was determined by quantitative $^{13}C$ NMR.

Figures 2A, 2B:
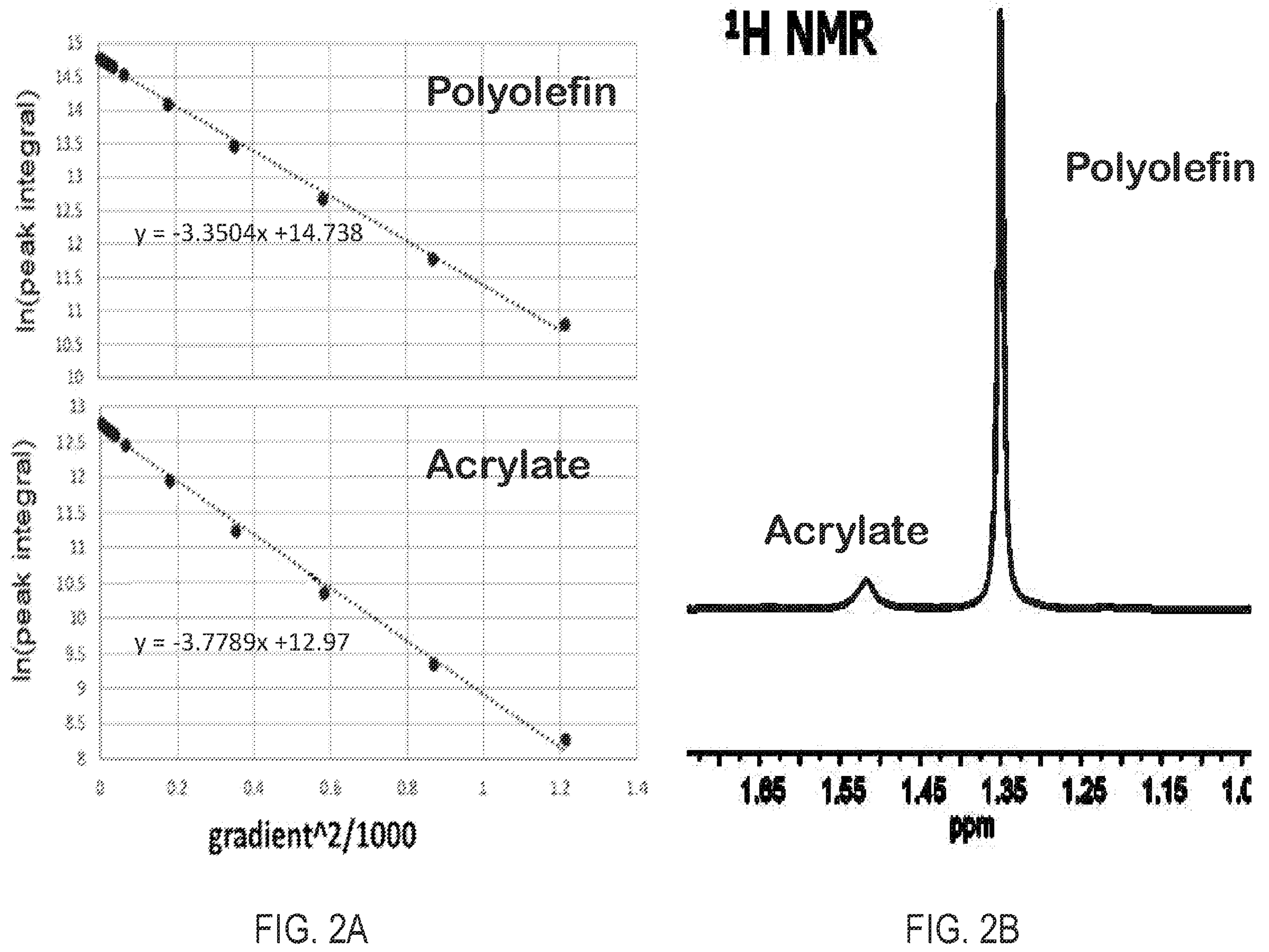
FIG. 2A is a graph of the integral of the proton NMR ($^1$H NMR) signal of tert-butyl resonance from the polar block or the methylene ($CH_2$) resonance from the non-polar block as a function of the gradient$^2$/1000.
FIG. 2B is the proton signal of tert-butyl resonance from the polar block and the proton signal of methylene ($CH_2$) resonance from the non-polar block.

FIG. 2A is a graph of the natural log of the integral of the proton NMR ($^1H$ NMR) signal of tert-butyl resonance from the polar block or the methylene ($CH_2$) resonance from the non-polar block as a function of the gradient$^2$/1000. In FIG. 2A, there are two linear lines, one according to the methylene in the polyethylene and the other charting the tert-butyl resonance in the polar block. Both lines have approximately the same slope, thus indicating that the acrylate monomers polymerized on in a controlled mechanism from the macroinitiator. Therefore, FIG. 2 indicates that the non-polar (polyethylene) block and the polar (polyacrylate) block are connected.

Although some examples include units derived from octene in the non-polar block, the amount of methylene derived from octene in the non-polar block is small enough to be considered negligible.

The results in the graph as shown in FIG. 2 were calculated using the procedure described in: "Molecular mass estimation by PFG NMR spectroscopy" by Crutchfield, C. A., and Harris, D. J. Journal of Magnetic Resonance, 185 (2007) 179-182.

Example 7—Polymerization Results

TABLE 2

Results of the synthesis of hydroxyl-functional polyolefins using thiol-ene addition (Compound 2)

| Compound | [vinyl] [mM] | Thiol [equiv.] | ABCN [equiv.] | Yield [%] | Product $M_{n, effective}$ [kDa] |
|---|---|---|---|---|---|
| Compound A2 | 60 | 5 | 0.5 | 94 | 8.0 |
| Compound B2 & C2 | 53 | 5 | 0.5 | quant. | 7.7 |
| Compound D2 | 200 | 3 | 0.5 | 96 | 1.5 |
| Compound E2 | 7 | 20 | 2 | 97 | 31.0 |
| Compound F2 & G2 | 6 | 16 | 1 | 96 | 29.8 |

TABLE 3

Results of the synthesis of polyolefin ATRP macroinitiators via esterification (Compound 3)

| Compound | [—OH] [mM] | 2-BMPB [equiv.] | $NEt_3$ [equiv.] | Yield [%] | Product $M_{n, effective}$ [kDa] |
|---|---|---|---|---|---|
| Compound A3 | 36 | 4 | 5 | 96 | 8.4 |
| Compound B3 & C3 | 33 | 4 | 5 | quant. | 8.0 |
| Compound D3 | 147 | 3 | 2 | 97 | 1.7 |
| Compound E3 | 7 | 9 | 16 | quant. | 30.0 |
| Compound F3 & G3 | 6 | 9 | 15 | 99 | 32.3 |

TABLE 4

Results of the synthesis of polyolefin-acrylate diblock copolymers via ATRP (Compound 4)

| Compound | Product $M_{n,effective}$ [kDa] | Polyolefin Block $M_{n,effective}$ [kDa] | tBA units [x] | nBA units [z] | Yield [%] | Wt % Acrylate [%] |
|---|---|---|---|---|---|---|
| Compound A4 | 10.7 | 8.4 | 18 | — | 88 | 22 |
| Compound B4 | 12.0 | 8.0 | 16 | 15 | 82 | 33 |
| Compound C4 | 15.6 | 8.0 | 19 | 40 | 89 | 49 |
| Compound D4 | 3.6 | 1.5 | 4 | 13 | 35* | 58 |
| Compound E4 | 36.9 | 30.0 | 54 | — | quant. | 19 |
| Compound F4 | 51.2 | 32.3 | 74 | 74 | 98 | 37 |
| Compound G4 | 60.8 | 32.3 | 67 | 156 | 97 | 47 |

*Low yield due to loss from spilling sample. Conversion was ~70% as targeted.

TABLE 5

| Parameters of deprotected diblock copolymers. | | | | | | |
|---|---|---|---|---|---|---|
| Compound | Product $M_{n,effective}$ [kDa] | Polyolefin Block $M_{n,effective}$ [kDa] | AA units [x] | nBA units [z] | Yield [%] | Wt % Acrylate [%] |
| Compound A5 | 9.7 | 8.4 | 18 | — | 90 | 13 |
| Compound B5 | 11.1 | 8.0 | 16 | 15 | 90 | 28 |
| Compound C5 | 14.5 | 8.0 | 19 | 40 | 88 | 45 |
| Compound D5 | 3.4 | 1.5 | 4 | 13 | 95 | 56 |
| Compound E5 | 33.9 | 30.0 | 54 | — | 97 | 12 |
| Compound F5 | 47.1 | 32.3 | 74 | 74 | 95 | 31 |
| Compound G5 | 57.1 | 32.3 | 67 | 156 | 95 | 43 |

Example 8—Surface Energy Study of Seven Films

The surface energy of seven films were studied to determine the effect the diblock polyethylene-polyacrylate polymer would have on a polyethylene film.

The comparative films included a blend of DOWLEX™ 2045G and/or SURLYN™ 9910. DOWLEX™2045G is an ethylene-octene copolymer with a melt index (190° C./2.16 kg) of 1.0 g/10 min (ASTM D1238) and a density of 0.920 g/cc (ASTM D792). SURLYN™9910 is an ionomer of an ethylene acid copolymer with a melt flow rate (190° C./2.16 kg) of 0.7 g/10 min (ASTM D1238) and a density of 0.970 g/cc (ASTM D792). SURLYN™9910 is a highly branched ionomer produced via random free-radical polymerization.

The composition of the seven films were as follows:

Comparative C1 was DOWLEX™2045G.

Comparative C2 was DOWLEX™2045G and 2 wt % SURLYN™9910.

Comparative C3 was DOWLEX™2045G and 5 wt % SURLYN™9910.

Comparative C4 was DOWLEX™2045G and 10 wt % SURLYN™9910.

Inventive Example 1 was DOWLEX™2045G and 2 wt % Compound D5.

Inventive Example 2 was DOWLEX™2045G and 5 wt % Compound D5.

Inventive Example 3 was DOWLEX™2045G and 10 wt % Compound D5.

The diblock, Compound D5, or SURLYN™9910, was blended with DOWLEX™2045G base resin at loadings of 2 wt %, 5 wt %, and 10 wt %. The blending was performed in a Haake bowl at 100 rpm and 220° C. for 10 minutes. Throughout the mixing process, the torque was stable in the range of 14-16 N*m. The blends were then removed from the Haake, allowed to cool to room temperature, and compression molded at 180° C. and 10 MPa for 7 mins to give films with thicknesses in the range of 1.5-2 mm.

The surface energy of each film was then measured with ARCOTEST dyne pens. In this method, the substrate was marked with a series of pens, each containing inks of a known surface energy. In these experiments, a set of 14 pens with a surface energy range of 28-54 dyne/cm in 2 dyne/cm increments were used. (The pen will form a continuous film on a substrate with a higher surface energy than its ink.) The surface was marked with a series of pens in order of increasing surface energy. Once the ink was no longer capable of wetting the substrate surface, as indicated by beading, the surface energy of the substrate has been exceeded and a value was assigned. Each plaque was tested at various times across a 6 week period. Each test was performed in duplicate, and the average surface energy value is reported.

Figure 3:
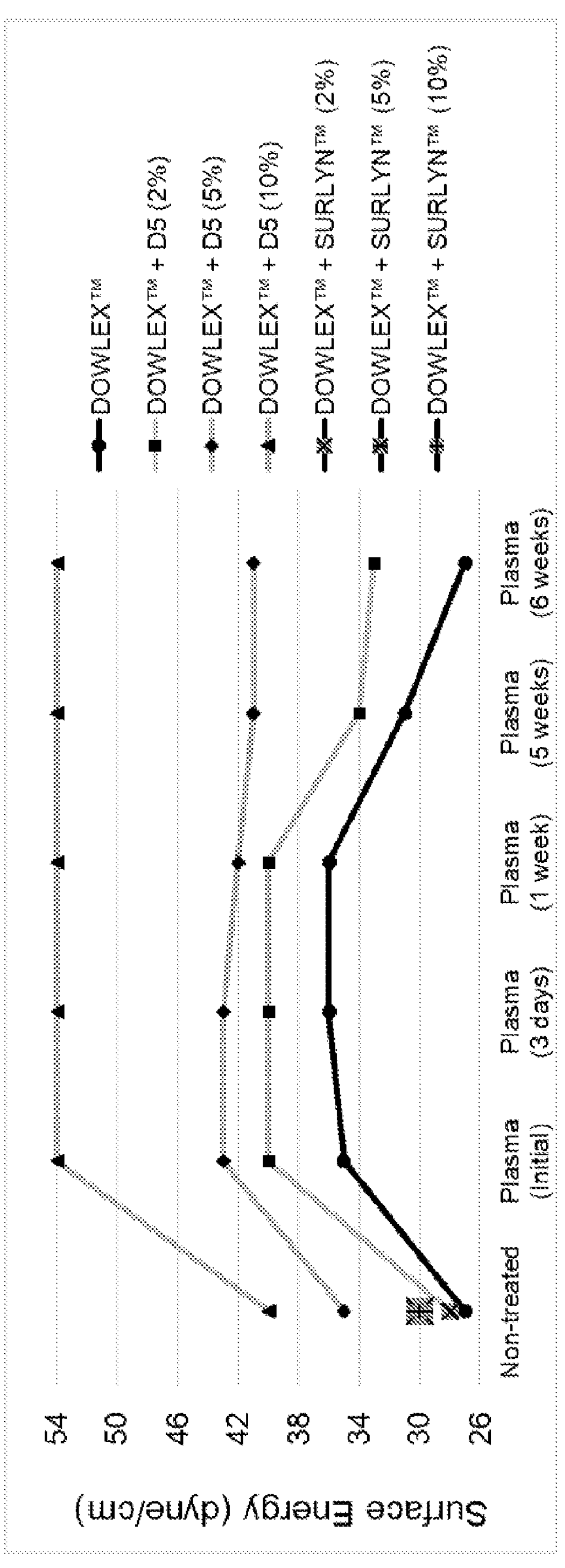
FIG. 3 is a graph of the Surface Energy (Dyne/cm) as a function a time when treated with a plasma treatment.

FIG. 3 illustrates the surface energy of the of seven polyethylene films. The surface energy of each film was measured at six times, when the films were: (1) not treated with a plasma treatment; (2) initially after plasma treatment; (3) three days after the plasma treatment; (4) one week after the plasma treatment; (5) five weeks after the plasma treatment; and (6) six weeks after the plasma treatment.

TABLE 6

| Surface Energy of Seven Films | | | | | | |
|---|---|---|---|---|---|---|
| | Non-treated | Plasma (Initial) | Plasma (3 days) | Plasma (1 week) | Plasma (5 weeks) | Plasma (6 weeks) |
| Inventive Example 1 | 28 | 40 | 40 | 40 | 34 | 33 |
| Inventive Example 2 | 35 | 43 | 43 | 42 | 41 | 41 |
| Inventive Example 3 | 40 | 54 | 54 | 54 | 54 | 54 |
| Comparative C1 | 27 | 35 | 36 | 36 | 31 | 27 |
| Comparative C2 | 28 | | | | | |
| Comparative C3 | 30 | | | | | |
| Comparative C4 | 30 | | | | | |

Comparative C1 showed the lowest surface energy at 27 dyne/cm. After initial blending of the additive SURLYN™ 9910, Comparatives C2, C3, and C4 showed an increased the surface energy to 28-30 dyne/cm. From these results, it was hypothesized that higher $M_n$ materials cannot migrate to the surface of the film.

In contrast, blends containing diblock additive, Compound D5, resulted in an increase of surface energy of up to 50% (40 dyne/cm) when the film included 10 wt % loading of Compound D5.

The films were then exposed to plasma treatment using a Model Plasmatreat FG5001 operating 3,000 W. The length of each film was treated twice at a speed of 0.1 m/s while maintaining a distance of 3 cm between the film and the Plasmatreat.

The surface energy of plasma treated Comparative C1 increased to 35 dyne/cm. Similarly, Inventive Examples 1 to 3 showed significant increases in surface energy. It was noted that the surface energy of untreated Inventive Example 2 (containing 5 wt % of Compound D5) exhibited the same surface energy as the Plasma treated Comparative C1. Thus, illustrating that higher surface energy can be achieved exclusively through blending.

Inventive Example 3 had a surface energy equal or above 54 dyne/cm once plasma treated, which was the upper limit for the set of dyne pens used for the measurements. Potentially, the surface energy of Inventive Example 3 could be significantly higher than 54 dyne/cm.

The seven films were aged for several weeks, testing the values periodically. After 6 weeks, the Comparative C1 had lost the benefits of the treatment, while Inventive Example 2 and Inventive Example 3 maintained a very high surface energy.

The invention claimed is:

1. A polymer blend comprising:

at least 60% by weight olefin-based polymer, and a diblock copolymer comprising a non-polar block and a polar block, wherein the diblock copolymer has a number average molecular weight number ($M_n$) less than 5000 g/mol as determined by proton nuclear magnetic resonance ($^1H$ NMR); and wherein the non-polar block and the polar block are connected by a thiol linkage.

2. The polymer blend from claim 1, wherein the polymer blend comprises from 0.5% by weight to 20% by weight diblock copolymer, based on the total weight of the polymer blend.

3. The polymer blend from claim 1, wherein the polymer blend comprises from 1% by weight to 15% by weight diblock copolymer, based on the total weight of the polymer blend.

4. The polymer blend from claim 1, wherein the polymer blend comprises from 2% by weight to 10% by weight diblock copolymer, based on the total weight of the polymer blend.

5. The polymer blend of claim 1, wherein the non-polar block comprises a polyolefin.

6. The polymer blend of claim 1, wherein the non-polar block comprises units derived from ethylene and optionally comprises units derived from one or more ($C_3$-$C_{12}$)α-olefin.

7. The polymer blend of claim 6, wherein the non-polar block comprises units derived from ethylene and propene, 1-butene, 1-hexene, or 1-octene.

8. The polymer blend of claim 1, wherein the non-polar block is an ethylene-based homopolymer.

9. The polymer blend of claim 1, wherein the polar block comprises units derived from one or more acrylate monomers.

10. The polymer blend of claim 1, wherein the polar block comprises monomers selected from n-butyl acrylate, tert-butyl acetate, acrylic acid, and combinations of n-butyl acrylate, tert-butyl acetate and acrylic acid.

11. The polymer blend of claim 1, wherein the $M_n$ ratio of the non-polar block to polar block is from 0.1:10 to 10:0.1.

12. The polymer blend of claim 1, wherein the diblock copolymer is a polyolefin-polyacrylate diblock copolymer.

13. The polymer blend of claim 1, wherein the thiol linkage comprises ($C_2$-$C_{12}$)heterohydrocarbylene, wherein the heterohydrocarbylene comprises a sulfur atom and an additional heteroatom chosen from a nitrogen atom or an oxygen atom.

14. The polymer blend of claim 13, wherein the thiol linkage comprises a first radical on the sulfur atom and a second radical on the additional heteroatom.

15. A film comprising the polymer blend according to claim 1.

16. The film according to claim 15, wherein the film has a surface energy of greater than 30 dyne/cm.

17. A method of treating a film, the method comprising: subjecting a film according to claim 15 to plasma treatment.

18. The method of claim 15, wherein the film has a surface energy of greater than 35 dyne/cm.

* * * * *